(12) United States Patent
Herriot et al.

(10) Patent No.: US 6,995,702 B2
(45) Date of Patent: Feb. 7, 2006

(54) AUTOMATIC EVOLUTION OF MIXED ANALOG AND DIGITAL ELECTRONIC CIRCUITS

(75) Inventors: James W. Herriot, Palo Alto, CA (US); Stuart A. Kauffman, Santa Fe, CA (US)

(73) Assignee: BiosGroup Inc., Sante Fe, NM (US)

(*) Notice: Subject to any disclaimer, the term of this patent is extended or adjusted under 35 U.S.C. 154(b) by 738 days.

(21) Appl. No.: 09/822,208

(22) Filed: Apr. 2, 2001

(65) Prior Publication Data

US 2002/0047796 A1 Apr. 25, 2002

Related U.S. Application Data

(63) Continuation of application No. PCT/US99/22917, filed on Oct. 1, 1999.

(60) Provisional application No. 60/102,685, filed on Oct. 1, 1998.

(51) Int. Cl.
*H03M 1/12* (2006.01)
(52) U.S. Cl. ...................... 341/155; 155/217
(58) Field of Classification Search ................ 341/155; 382/217, 155; 365/184
See application file for complete search history.

(56) References Cited

U.S. PATENT DOCUMENTS

| | | | |
|---|---|---|---|
| 3,601,811 A | 8/1971 | Yoshino | 340/172.5 |
| 3,638,196 A | 1/1972 | Nishiyama et al. | 340/172.5 |
| 4,479,241 A | 10/1984 | Buckley | 382/15 |
| 4,774,677 A | 9/1988 | Buckley | 364/513 |
| 4,802,103 A | 1/1989 | Faggin et al. | 364/513 |
| 4,803,661 A * | 2/1989 | Mandl | 365/184 |
| 4,989,256 A | 1/1991 | Buckley | 382/15 |
| 5,140,538 A * | 8/1992 | Bass et al. | 382/217 |
| 5,161,203 A | 11/1992 | Buckley | 382/15 |
| 5,940,529 A * | 8/1999 | Buckley | 382/155 |

OTHER PUBLICATIONS

Gayles, E. S.; Owens, R.M.; Irwin, M.J., The MGAP-2 : A Micro-Grained Massively Parallel Array Processor , IEEE Transactions on ASIC Conference and Exhibit Sep. 18-22, 1995, pp. 333-337.*

McDonnell, J. R.; Waagen, D., Evolving Recurrent Perceptrons For Time-Series Modeling , IEEE Transactions on Neural Networks vol. 5, No. 1, Jan. 1994, pp. 24-38.*

(Continued)

*Primary Examiner*—Jean Jeanglaude
(74) *Attorney, Agent, or Firm*—Pennie & Edmonds LLP

(57) ABSTRACT

A method and system for evolving electronic circuits based on defined rules. A first approach uses a network of nodes having established topological and behavioral relationships amongst themselves. An A/D converter is developed using this approach. A second approach employs software agents to create signal filters. The software agents are allowed to evolve in signal parameter space so as to match a reference signal, subject to established evolutionary rules and parameter space constraints. Narrowband and a low-pass filters can be formed using such agents.

12 Claims, 11 Drawing Sheets

OTHER PUBLICATIONS

Kawashima, T; Hashimaya, T.; Furuhashi, T; Okuma, S., A proposal of multi-agent type adaptive digital filter, IEEE interim Conference on Systems, Man, and Cyvernetics, vol. 3, pp. 2338-2341, Oct. 11-14, 1998.*

Kavaslar, F.; Guzelis, C., A Computer-assisted investigation of a 2-D array of Chua's circuits, IEEE Transactions on Circuits and System I: Fundamental Theory and Application, vol. 42, No. 10, pp. 721-735, Oct. 1995.*

Rao, S. S.; Ramasubrahmanyan, A.; Singh, A., Systems and Computers, Evolving IIR approximants for FIR digital filters, Conference Record of the Twenty-Ninth Asilomar Conference on Signals, Oct. 30-Nov. 2, 1995, vol. 2, pp. 976-979.*

* cited by examiner

AUTOMATIC EVOLUTION OF MIXED ANALOG AND DIGITAL ELECTRONIC CIRCUITS

CROSS REFERENCE TO RELATED APPLICATIONS

This application is a continuation of the U.S. national phase designation of PCT application No. PCT/US99/22917, filed Oct. 1, 1999, the contents of which is expressly incorporated herein by reference thereto. This PCT application claimed priority to U.S. provisional application No. 60/102,685 filed on Oct. 1, 1998, the entire content of which is expressly incorporated herein by reference thereto.

FIELD OF THE INVENTION

The present invention concerns systems and methods for developing functional circuitry for electronic components. It is particularly directed to developing hybrid integrated circuits which incorporate both analog and digital components.

BACKGROUND OF THE INVENTION

A long standing problem in the semiconductor industry has been the inability to put analog and digital devices on the same chip. Many products ranging from cell phones to hard disk drives have both analog and digital components. Typically the analog components interface with the "real world" and the digital components do the internal logic. For example, on a cell phone the analog components include radio receivers and transmitters, and the digital components support the many features of the cell phone like call waiting, re-dialing, etc. Likewise on a hard disk drive, the interface with the magnetic read-head is analog, and the data transfer to the host computer is digital.

The pressures of competition tend to force companies toward "smaller, faster, cheaper." In semiconductor terms this translates to smaller chip count, where the "holy grail" is the single chip product. If the products have both analog and digital components, this would mean a single chip with both analog and digital devices on the same shared semiconductor substrate.

Heretofore, mixed analog-digital devices have been impractical. This is because digital devices generate large amounts of electronic noise, and analog devices typically do not function properly in the face of even small quantities of electronic noise. Digital devices generate noise "spikes" every time they switch from zero to one, or from one to zero. Needless to say, this switching takes place quite frequently, as in millions of times per second typically. The digital devices themselves are quite robust against (their own) noise because "anything close to one" is interpreted as a one, and likewise for zero. With only two possibilities, zero and one, there is much "room for error."

Analog devices, on the other hand, are quite sensitive to electronic noise. Instead of representing information as only 0s and 1s, analog devices represent information as a spectrum of gradations between, say 0 and 1. So, where 0.9 gets "rounded" to 1 in a digital device, in an analog device 0.9 and 1.0 are distinctly different values. Any electronic noise which would blur 0.9 with 1.0, or even 0.90 with 0.91 would degrade the functionality of the analog device.

If this mixed analog-digital problem could be solved, many products could be built smaller, cheaper, and brought to market more quickly. Even if the solution called for analog components which would take up more space or "semiconductor real estate", this would be acceptable because typically the analog devices are a small part of the overall unit. The digital components dominate in space utilization. So, even a doubling or tripling of the analog "foot print" would be happily exchanged for the consolidation of the entire unit into a single chip.

In addition to the great need to build mixed analog-digital devices on a single chip, there is another equally important need to bring chips to market more quickly. These time-to-market pressures have already created a strong demand for field programmable gate arrays. FPGAs are an example of general way of designing chips which can be customized and targeted toward a wide range of specific functionalities. FPGAs are popular because chip production is, in effect, pushed from chip "hardware" design into "software" thus greatly speeding up the process.

FPGAs are an artifact of the digital world, and do not have a use in the mixed analog-digital design space. And yet, the same time-to-market pressures are present for hybrid analog-digital devices. If a general approach could be discovered to build these mixed analog-digital devices, many products could be brought to market much faster, and for a much lower cost.

As we will see in this patent application, this approach we have used makes possible mixed analog-digital chips, and a way to evolve these chips so a single semiconductor design can be re-targeted to a wide variety of functional uses.

SUMMARY OF THE INVENTION

The present invention is a method of designing and building new electronic circuits on semiconductor chips which makes possible the combination of both analog and digital devices on the same chip or substrate. A wide variety of electronic devices can be designed in this manner including general devices which can be molded to a specific functionality after the chip has been fabricated. The general methods employed in this patent are the use of networks of sub-devices, redundancy of such devices, and dynamic evolution of such devices. The benefits of this invention are manifold. One benefit is the ability to build noise-resistant analog devices which can easily reside along side digital devices on the same substrate. This solves an age-old problem in the chip industry. In addition, this invention makes possible much greater flexibility in the process of designing semiconductor devices, and promises to speed up time to market for many chip-based products.

A preferred embodiment of the invention comprises an integrated circuit on which is formed a two-dimensional array of interconnected processing elements having at least one attractor known to be associated with at least one output value. Each processing element in the interior of the array comprises two inputs from processing elements on either side along a first dimension of the array; two outputs to processing elements on either side along a second dimension of the array; and Boolean logic circuitry for generating an output signal that is a Boolean function of two input signals. At least some of the processing elements in the interior of the array comprise circuitry for changing the magnitude of the output signal from the Boolean logic circuitry and for applying it to both outputs and threshold circuitry for comparing signals on the two inputs with a threshold value and providing binary input signals to the Boolean logic circuitry having a first value if the signal on an input exceeds the threshold and a second value if the signal on the input does not exceed the threshold value. Some processing elements on the edge of the array comprise a first input from a processing element in the interior of the array; a second input from outside of the array; two outputs to processing elements on either side along the edge of the array; a differential amplifier for comparing signals on the first and second inputs and providing a binary output signal having a first value if the signal on the second input exceeds the signal on the first input and a second value if the signal on the second input does not exceed the signal on the first input; and circuitry for changing the magnitude of the binary output signal and for applying it to both outputs. Advantageously, multiple such arrays are formed on a single integrated circuit.

A preferred method of using the invention is to apply an input signal to one or more of the second inputs to the array(s) and to detect into which attractor each array falls. Where multiple arrays are used, a voting circuit may be used to determine which output value occurs the most number of times.

The invention may be used for numerous signal processing applications. For example, it may be used for analog to digital conversion and a specific example of such application is disclosed. It may also be used to develop a filter, and a specific example of this is also disclosed herein.

BRIEF DESCRIPTION OF THE DRAWINGS

This and other objects, features and advantages of the invention will be more readily apparent from the following detailed description in which.

DETAILED DESCRIPTION OF THE INVENTION

This invention stems from the imaginative application of recent ideas from computational biology and genetics applied to design of electronic circuits and semiconductor integrated circuit chips. In order to understand this invention, it is necessary to understand a number of non-trivial key concepts and then see how they combine together into the design of entirely new semiconductor devices. Accordingly, this patent application will walk through a series of ideas, didactically or tutorial style, in order to build the new ideas presented here.

Much of content of this invention is based on the notion of (boolean and analog) networks of connected similar elements. Although the invention itself is based on analog networks, or at least hybrid digital-analog networks, an explanation of their simpler cousin, boolean networks will help build the foundation concepts for the more sophisticated analog networks. For a general discussion and explanation of Boolean networks, see Stuart Kauffman, *The Origins of Order* (Oxford University Press, 1993).

Boolean networks, as described here, can be thought of as a two-dimensional array of connected nodes, each of which has a "state" or value of zero or one. Another way to imagine a boolean network is to think of a checker board or tic-tac-toe board with a light bulb screwed into each square of the board. Each light bulb (node) is either on (one) or off (zero). The state of the entire network (or lattice) is the aggregate state of the nodes all taken together as a single device.

Figure 1:
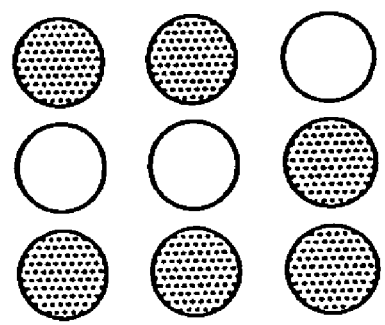
FIGS. 1–4 are diagrams illustrating network connectivity.

FIG. 1 illustrates a 9-node network where six of the nodes are "on" or have the value one and three of the nodes are "off" or have the value zero This network taken as a whole can have a total of $2^9$=512 unique states. In addition to the individual nodes, there are interconnections between pairs of nodes which function to transfer information from one node to another. Each node has some number of inputs from other nodes, and some number of outputs to other nodes in the network.

Figure 2:
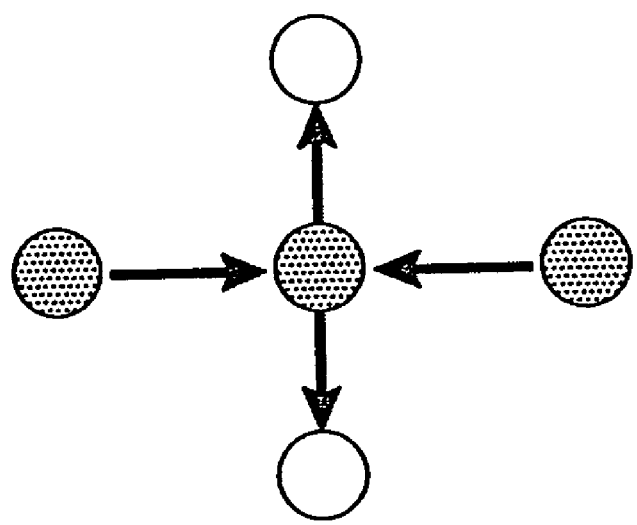

FIG. 2 shows a partial network with a central node receiving two inputs from the nodes on its left and right (or "east and "west") and sending output signals to two other nodes above and below it (or "north" and "south"). In a homogeneous network where all nodes have the same number of inputs, or k inputs, we call such networks k=2 networks. In this patent application we will typically use k=2 networks; however, the principles in this invention apply equally well to networks with different values of k, or even non-homogeneous networks.

The input/output interconnections of the nodes can be in a random pattern or a regimented pattern. The principles in this invention apply equally well regardless of the pattern of interconnections. However, in the implementation of many electronic applications, and for ease of illustration and understanding, we use a regimented pattern or alternating interconnections in a k=2 network in the text here.

Figure 3:
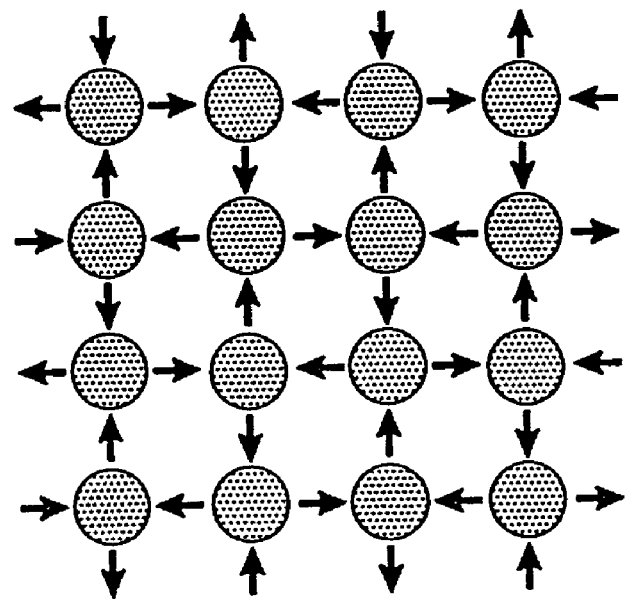
Figure 4:
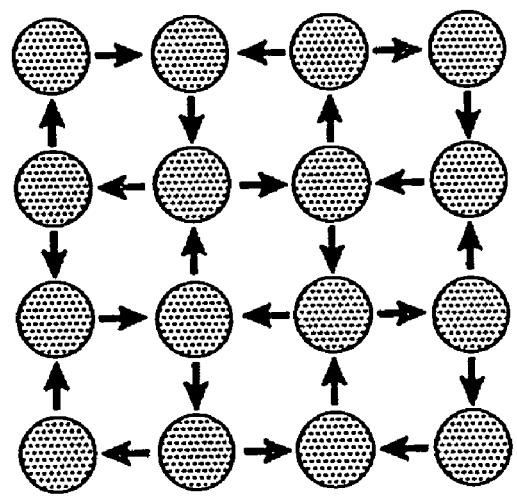

FIG. 3 shows such an interconnection pattern for a 4×4=16 node network, where inputs alternate in an east-west, north-south manner. It is noted that the interconnection topology shown in FIG. 3 is a torus with the edges "folded" around to meet the opposite edges. Although this toroidal layout is mathematically general and "ideal", it is neither necessary nor often practical in electronic applications where the pressures of 2-dimensional geometry dominate. In the strictly two dimensional case, all the edge connections (arrows) are deleted, but the functionality is still intact enough to be quite useful for practical applications. However, in the preferred embodiment, we will typically use this restricted 2-dimensional regime, as shown in FIG. 4.

As can be seen in FIG. 3, all of the nodes have exactly two inputs and two outputs. In the restricted 2-dimensional network of FIG. 4, the inner nodes also follow this pattern, although the edge nodes are compromised in their interconnections.

So far we have discussed the static aspect of boolean networks. We will now consider the dynamic side of boolean networks, or how networks change state over time. Although the principles of this invention would apply to non-synchronous networks, we will simplify the explanation here by considering synchronous networks where all of the nodes change state "simultaneously" according to the pacing of a "central clock."

At any time t or a certain "clock tick", the network is in a state s. At time t+1, the values or state of each of the nodes is re-computed as a function of its inputs as they were at time t to produce a new state of the network we will call s' or "s-prime". For each node in a k=2 network, there are two inputs, each of which can be either a zero or one. Therefore, there are 2×2=4 possible pairs of input patterns. The boolean function which maps each of the four possible input patterns into either a zero or a one we will call f(a,b). If function f is a boolean "and" function, then the function could be defined according to a simple boolean rule table as shown in FIG. 5.

Figures 5, 6:
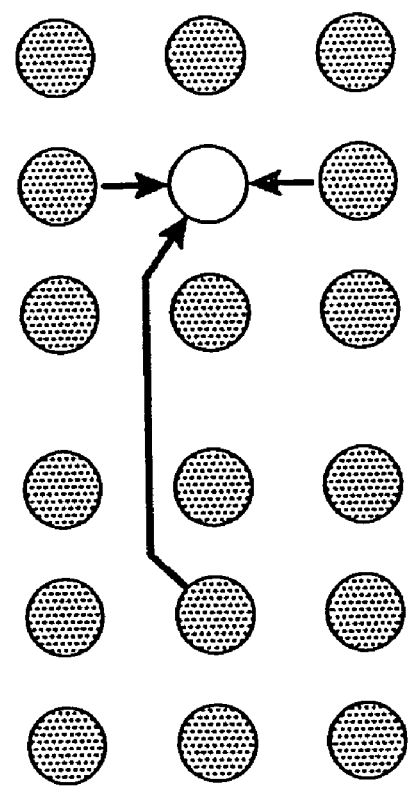
FIG. 5 is an AND function rule table.
FIG. 6 is a diagram illustrating a double layer network.

FIG. 5 shows a two input boolean "and" function with the four possible outputs designated inside the 2×2 box. Hence the boolean "and" function can be abstracted into a string of four bits, "0001" which is its rule table. The boolean "or" function can be likewise abstracted as the string "0111" and xor "0110", etc. likewise. There are 16 possible 4-bit strings so it follows that there are 16 possible boolean functions governing the behavior of these k=2 boolean networks.

As time moves forward, the state of the network changes as well. For a 4×4=16 node network as shown in FIGS. 3 and 4, there are $2^{16}$ or 65536 possible states, or the size of the state space is 65536 vertices on a 16-dimensional hypercube. At each clock tick the network is in effect moving through this state space.

Attractors

Since this type of boolean network is a deterministic state machine, if it ever exactly repeats a previous state, it will repeat all subsequent states falling into a lock-step repeating state cycle. This repeating state cycle is called an attractor. Attractors may be short or long in duration. Depending on the initial state of the network, the network may "fall" into any of a number of basins of attraction. This invention makes great use of attractors, in particular, networks which have a rich number of different attractors, rather than a single attractor or few attractors.

Order and Chaos

Networks of the type discussed here can be "tuned" such that nearby trajectories tend to "converge" quickly toward attractors, or alternatively that they "diverge" into chaos where the duration of an attractor state cycle is so unimaginably long so as to suggest using a different designation than the word attractor. The former is often called the ordered regime, while the later is called the chaotic regime. There is no gradual slope from order to chaos. Rather, there is an abrupt change or a phase change separating order and chaos. There are a variety of control "knobs" which can adjusted to "move" a network from order to chaos, and vice versa. For example, increasing the value of k (as in k=2 number of interconnections) will tend to push a network into the chaotic regime. Other factors, like the so-call p value, canalization, etc. can have an effect on the network's location in the order-chaos spectrum as well.

As in nature and its living organisms, it appears that the best devices (of the genre described here) are poised in the ordered regime very close to the phase change boundary, or on the edge of chaos. The devices described in this patent application are designed to reside near this edge of chaos. For additional information, see S. Kauffman, *The Origins of Order*.

Double Layer Networks or "Hyperchips"

As indicated above, this invention will utilize networks with at least a moderate number of attractors. As discussed later, more (as opposed to fewer) attractors are preferred when building many devices as described in this patent. For small boolean networks (~50 nodes) as described above of, say 7×7=49 nodes, the number of attractors varies from a few to a few dozen attractors. However, it is possible to greatly increase the number of attractors though a technique which is specifically called out as part of this patent. For this we use a double-layer network scheme. FIG. 6 shows a very small double layer network in order to illustrate the concept. For actual applications, one would use larger networks.

In a double-layer network, there are two lattices logically "one on top of the other." The "upper" lattice is the "main" network is operates much as the other networks already discussed above. In FIG. 6, the upper layer is a 3×3=9 node network. The lower layer is the same size. Each node in the upper layer receives its k=2 inputs from two other (adjacent) nodes. What is different here is that in addition to the usual inputs from its own layer, each node receives an extra input from the node "directly beneath it." Hence, the function used to compute any subsequent state of the upper layer has three inputs: f(a, b, c), where a and b are "horizontal" inputs and c is a "vertical" input from below.

The network is "run" by first initializing both the upper and lower networks to some initial state. The upper is then "run" to an attractor. When the attractor is found, a canonical state in the attractor's repeating state cycle is copied to the lower lattice, and the upper state is re-initialized to its original initial state. The upper lattice is once again run to an attractor, but now the lower layer is different from last time.

Hence, the upper layer will behave quite differently and find a very different attractor than it found before. Once this new attractor is found, once again a canonical state is copied to the lower layer. This process is repeated until the lower layer finds an attractor.

This double layer scheme has a very large number of lower-layer attractors, as compared to a simple single-layer topology. Rich repertoires of attractors are very useful, as we will see, in designing mixed digital-analog electronic devices.

Analog Networks

Analog networks are similar to the boolean networks discussed above, except that instead of the nodes having only two states (zero and one), the nodes of analog networks can take on a full range of real-number values. We illustrated the idea of boolean networks with a grid of light bulbs which are either on or off. Analog networks can be illustrated similarly except each of the light bulbs is now on a "dimmer switch" and can vary in brightness from off to dim to brighter to brightest, etc. As a convention, we will limit the values of analog nodes to the real numbers between zero and one, inclusive. Other numerical values could be chosen but would not materially affect the principles driving this invention—and would just complicate the explanation.

The connectivity issues are the same for analog networks. However the functions which are used to determine the next values of the nodes and hence the next state of the network is different. There are a number of ways to define the analog equivalent of the boolean functions. The principles in this invention are independent of how these functions are defined. There are trade-offs and engineering considerations in choosing an appropriate analog function for an analog network. Some functions have greater mathematical simplicity and elegance, while other functions are easier to implement in electronic circuits on silicon or otherwise.

Analog Networks: Disjunctive Normal Form

The most mathematically pure way to implement the analog functions used to drive an analog network is disjunctive normal form or DNF. Here we simply define the analog function f(a,b) as a sum of products. Table 1 shows a table of the 16 possible 2-input boolean functions with their truth tables. For each of the boolean functions, there is a corresponding arithmetic expression of a sum of products, where the variables A and B are the inputs to the function, f(a, b). DNF generalizes beyond 2-input boolean functions to n-input boolean functions.

In Table 1, the "Long-form of Equations" on the right is the sum of products as mentioned above. For example the and function is simply f(A,B)=AB. The or function is a bit more complicated, f(A,B)=(1−A)B+A(1−B)+AB. It is trivial to see that if the inputs are boolean values, zero or one only, the outputs will be the correct boolean outputs, as if computed from an ordinary boolean function. However, if the inputs are analog, the outputs will also be analog.

TABLE 1

| Function | Output | Truth-Tab | Decimal | Long-form of Equations | | | |
|---|---|---|---|---|---|---|---|
| zero | 0 | 0000 | 0 | | | | |
| A and B | AB | 0001 | 1 | | | | AB |
| Not (if A then B) | A−AB | 0010 | 2 | | A(1−B) | | |
| A | A | 0011 | 3 | | A(1−B) | | + AB |
| Not (if B then A) | B−AB | 0100 | 4 | (1−A)B | | | |
| B | B | 0101 | 5 | (1−A)B | | | + AB |
| A xor B | A+B−2AB | 0110 | 6 | (1−A)B | + A(1−B) | | |
| A or B | A+B−AB | 0111 | 7 | (1−A)B | + A(1−B) | | + AB |
| A nor B | 1−A−B+AB | 1000 | 8 | (1−A) (1−B) | | | |
| A xnor B | 2AB−A−B+1 | 1001 | 9 | (1−A) (1−B) | | | + AB |
| Not B | 1−B | 1010 | 10 | (1−A) (1−B) | | + A(1−B) | |
| If B then A | 1−B+AB | 1011 | 11 | (1−A) (1−B) | | + A(1−B) | + AB |
| Not A | 1−A | 1100 | 12 | (1−A) (1−B) | + (1−A)B | | |
| If A then B | 1−A+AB | 1101 | 13 | (1−A) (1−B) | + (1−A)B | | + AB |
| A nand B | 1−AB | 1110 | 14 | (1−A) (1−B) | + (1−A)B | + A(1−B) | |
| one | 1 | 1111 | 15 | (1−A) (1−B) | + (1−A)B | + A(1−B) | + AB |

Analog Networks: 3-step Computation Technique

From a mathematical standpoint DNF is perhaps the best way to define the analog functions which drive an analog network. However, for practical electronic applications, alternative methods are often indicated. Two candidate methods use sigmoidal functions, $1/(1+e^{-x})$, and $e^{-x}$. We discuss the $e^{-x}$ method below, but the approach is almost identical for a sigmoidal or any other such function.

An alternative to the DNF approach is a 3-step computation for each f(a, b) used to compute the new value of each node when computing the next state of an analog network. The three steps are as follows:

| | | |
|---|---|---|
| 1. Threshold: | analog −> bit | threshold at 0.5 for 0–1 range |
| 2. Truth table: | 2 bits −> 1 bit | classic Boolean network procedure |
| 3. Interpolation: | bit −> analog | use $e^{-t/tau}$ function |

A more detailed explanation of the computational steps follows:

Step 1: For each of the two input values coming in from the two adjacent nodes, we compare the values against 0.5 and produce a binary value, 0 or 1 depending on whether the input value is lesser or greater that 0.5. (The value corresponding to 0.5 exactly can be either 0 or 1 but must be deterministic). So step one effectively maps arbitrary analog values deterministically to binary or boolean values.

Step 2: This is the same as for boolean networks. One of 16 boolean functions f(a, b) is used to produce a single boolean output from the two boolean inputs.

Step 3: The goal of this stage is to map the boolean value resulting from step 2 back into an analog value, so the node itself be an analog node. The function we use here is an "interpolation" function. As mentioned above, there are a variety of candidates including sigmoidal functions, etc. We will discuss using an $e^{-x}$ or $e^{-t/tau}$ function here. Such functions have the advantage of being easily implemented electronically as a simple cheap capacitor.

Intuitively, if the output from step 2 is a one, we would like the analog value of the node to drift asymptotically toward the limit of one. Likewise if the output from step 2 is a zero, we would like the analog value of the node to drift asymptotically toward the limit of zero. This would imitate boolean functions in the limiting case. The $e^{-x}$ function accomplishes this goal quite well.

However, we want one more thing: we would like to control how fast the node values tend toward the asymptotes of zero and one. Hence, we need a time constant, tau. So the $e^{-x}$ interpolation function is slightly modified to include the clock tick t and a time constant tau, and the new more useful function is, $e^{-t/tau}$. Advantageously, the clock tick t counts from the most recent change in the output from step 2, that is, from the most recent "bit flip."

Whereas the behavior of a boolean network is uniquely determined by the connectivity and the per-node boolean functions, in an analog network of this sort, the network also needs an array of tau values, one per node, to uniquely determine its behavior. When we later discuss evolution of analog networks, we will specifically be evolving the boolean functions and the tau values.

Simplified Tau Tables

Although tau values can, in principle, be any positive real number. In practice, only a small number of distinct values are typically needed. Space conservation pressures push for designating, say 15 possible values and encoding them in four bits. Accordingly, we use the following conventions to encode 15 possible tau values:

TABLE 2

| x | 1 | 2 | 3 | 4 | ... | 14 | 15 |
|---|---|---|---|---|---|---|---|
| 20/x = | 20/1 | 20/2 | 20/3 | 20/4 | ... | 20/14 | 20/15 |
| tau = | 20 | 10 | 6.6 | 5 | ... | 1.42 | 1.32 |

In the tau tables further below specifying a particular analog-to-digital converter design, we use the base ten values of x in the above table 2 as a short hand for the corresponding tau values.

Attractors in Analog Networks

We defined an attractor in a boolean network as a exact repetition of a previous state of the network. For analog networks, we need a definition of an attractor which does not require exact repetition because while states may be almost identical to previous states, they may not be an exact match. An attractor is a kind of "loop" or orbit in state space. In the case of a boolean network, this orbit is discrete and repeatable. In analog state space, the network may loop ever closer to an asymptotic orbit, but never actually get there. So, we define a state cycle as an orbit in state space which is within epsilon of some previous orbit, where epsilon is some arbitrary but small value, for example 0.1. This is called a Poincare Section.

Separatrix Boundaries

Typically (when a network is in the ordered regime) many initial states of the network will tend to flow into the identical attractor. This tendency is reminiscent of how water flows down valleys or basins into lakes. Hence, this water metaphor can help enhance our intuition for understanding characteristics of these networks. Using this image, we can imagine a drop of water landing in most places and flowing quite unambiguously down toward and into a particular lake. Even if the droplet were to bounce about a bit, in most cases it would still end up in the same lake. However, imagine a drop landing on a mountain saddle. From there it might "equivocate." It could flow in either one of two possible directions into one of two different possible lakes, depending on small perturbations in its landing on the ground.

Figure 7:
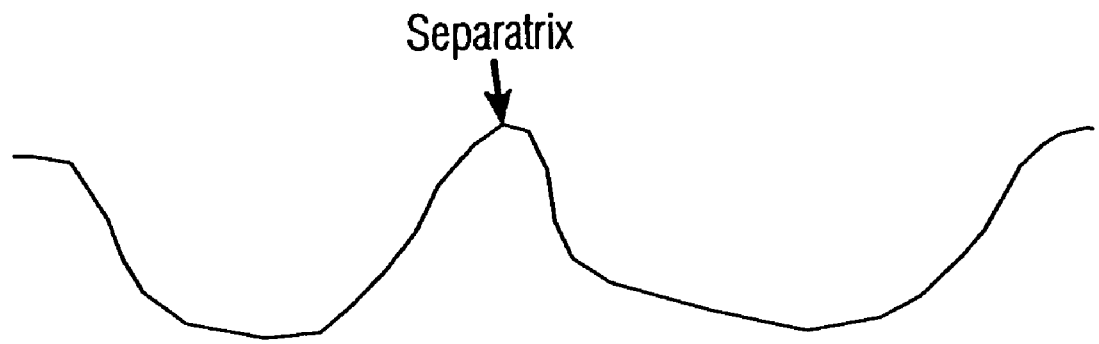
FIG. 7 is a diagram illustrating a separatrix.

Likewise in networks, most similar initial states (measured, for example, by Hamming distances), will flow toward identical attractors. However, in some (unusual) cases, very similar initial states can flow to different attractors. This moral equivalent of the mountain saddle is called a separatrix in the terminology of complex systems, as illustrated in FIG. 7.

Noise

There are two basic types of electronic noise which analog devices have to contend with: correlated and uncorrelated noise. Correlated noise will affect the entire network homogeneously and hence the network will "ride" the noise, much like a large ship rides the waves at sea: relations among internal components will be unaffected. Uncorrelated noise is more difficult to defend against. It is precisely this type of noise where conventional analog designs fail and this novel analog networking approach, which is at the core of this invention, succeeds so well.

For a system with lots of (informational or electronic) uncorrelated noise, networks (in the ordered regime) can be made robust against noise in the same way that the rain drop in the above image will typically flow into the same lake even if it bounces around a bit on the way down the hill. It is the redundancy built into these networks which gives them their ability to defend against noise. As long as the network state stays away from a local separatrix, it will reliably flow to the same attractor regardless of reasonable amounts of noise.

As we will see, this robustness against noise is a key benefit of these networks. In effect we trade off some redundancy (and therefore footprint area) for robustness against noise. For many electronic circuits where digital footprint dramatically dominates over analog footprint, even a large increase in the area taken up by the analog device has little effect on the overall space requirements, and is therefore quite acceptable for the overall design and space budget.

Hybrid Analog-Digital Networks

For some purposes, it is advantageous to mix analog and digital nodes. Digital nodes tend to give a network more "stability", that is, fewer more stable attractors. A few well placed digital nodes in the midst of a "sea" of analog nodes can serve as the moral equivalent of control rods in a nuclear reactor, heading off down possible chain reactions which might lead to chaos.

Injection of Signals into Analog Networks

In practical applications of analog networks, we would often like the network to go to a particular attractor depending on some external signal. The attractor is in itself a kind of logical "device"—in the case of electronic applications, an attractor can be thought of as a (virtual) electronic device. This is a very powerful concept and is useful in designing various electronic circuits and components. Sometimes, the character of the network (fluctuations) when it is cycling in its attractor is useful. Often, the particular attractor the network settles into can be used to detect some characteristic in the input signal.

There are a number of ways to inject signals into an analog network. One way is to take an "outside world" external analog signal and use that "voltage" or value to initialize all the nodes in the network. Then we "unhook" the external input while the network is left to settle into a corresponding attractor "on its own." This is a very effective approach, except that it may not be practical (geometrically) to inject the signal into all the nodes, and it may be impractical to "unhook" the signal for some period while the network does its "processing."

Figure 8:
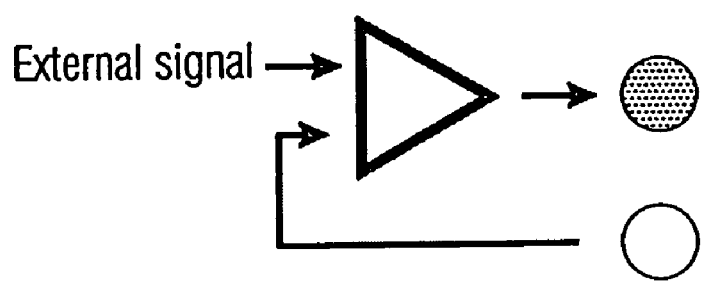
FIG. 8 is a diagram illustrating the connection of a differential amplifier in a network of the present invention.

An alternative more practical approach is to inject the external analog signal through selected edge nodes, and to inject them through some mediating component, for instance, a differential amplifier. FIG. 8 shows the how an external signal can be injected through an differential amplifier (triangle) which compares the external signal with the output from some nearby (lower circle) node, producing a single bit input to the (step 3) interpolation function of a (upper circle) node. In this way, the external signal can be connected continuously throughout the network's processing and descent into an attractor.

Topology of Networks

The ideas in this invention do not depend on a particular size of the network. There are various engineering issues which can be traded off, but the fundamental issues in this invention are invariant over the scale of the network (other than networks of a trivially small size). For the purpose of many of the explanations in this patent, we will use 7×7=49 node networks. These networks have a convenient size for didactic purposes and are relatively easy to model on digital computes. But otherwise, this choice of size is arbitrary.

As mentioned above, networks with a toroidal topology can more easily have regular interconnection patterns since there are no "edges" per se. When we require rigid flat two-dimensionality, this requirement creates edges, and corresponding edge-anomalies in the connectivity patterns.

Figure 9:
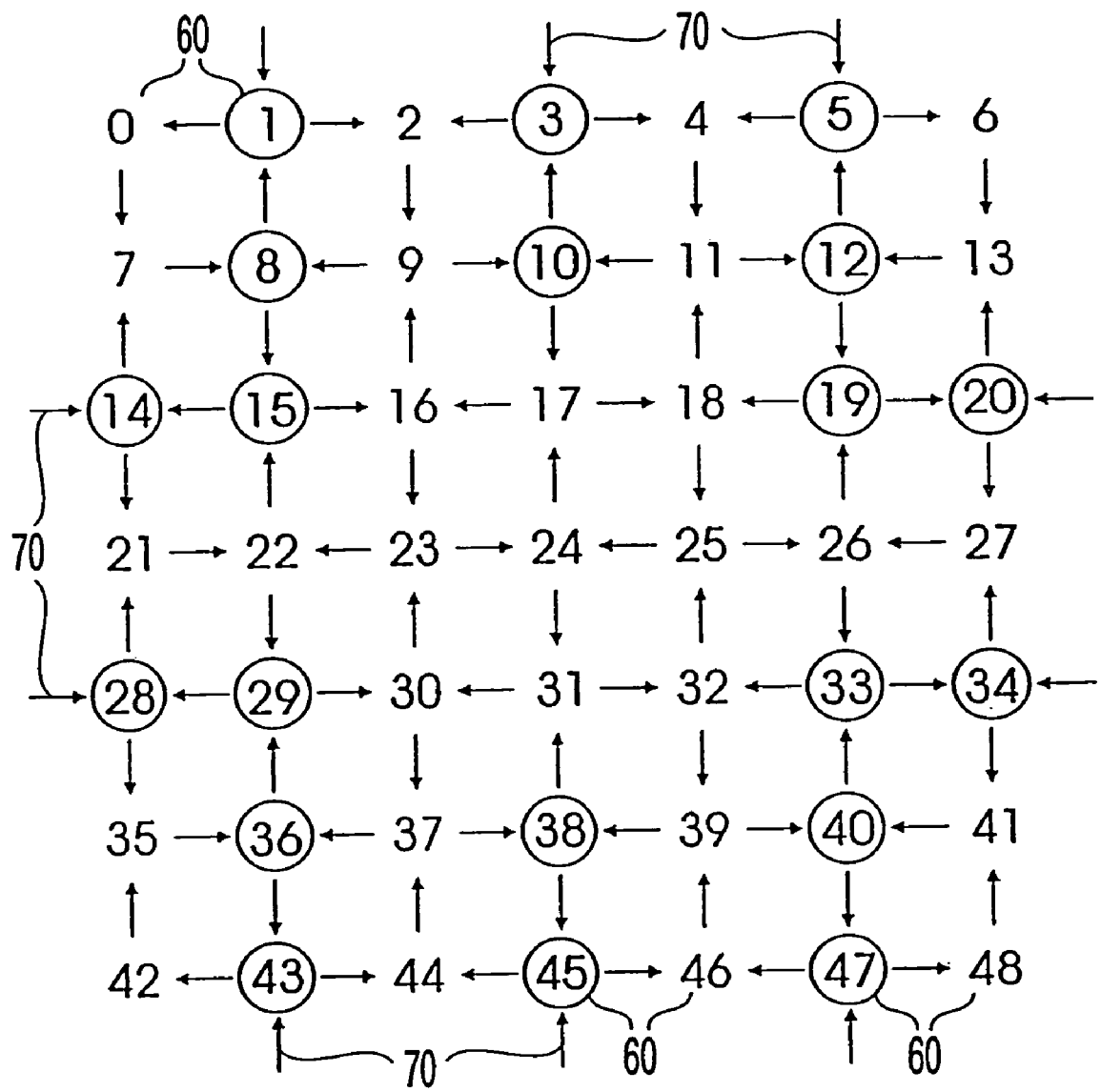
FIG. 9 is a diagram illustrating a network of the present invention.

FIG. 9 depicts a network comprising a two-dimensional (7×7) array 50 of nodes 60. Each node 60 is connected to each of its nearest neighbor nodes in the array. At a minimum, as at the outside corners of the array, the connection is in the form of an input from a nearest neighbor node in a first dimension and an output to a nearest neighbor node in a second dimension. In the interior of the array, each node 60 has two inputs, one each from the two nearest neighbor nodes on either side of it in a first dimension, and two outputs, one each to the two nearest neighbor node on either side of it in a second dimension. The remaining nodes are on the edge of the array and each one has either two inputs from nodes on either side of it on the edge and an output to the interior of the array or one input from the interior of the array and two outputs to nodes on either side of it on the edge.

For ease of reference, the individual nodes have been numbered from 0 to 48 and their inputs and outputs from and to adjacent nodes have been identified with arrows pointing in the direction of signal flow. Several of the nodes also have signal inputs from outside the array. In particular, nodes 1, 3, 5, 14, 20, 28, 34, 43, 45 and 47 receive signal inputs from outside the array as indicated by the incoming arrows 70.

The array of FIG. 9 can be conveniently represented by several 7×7 matrices of numbers. First, the numbering of the nodes is as set forth in Table 3.

TABLE 3

| [ 0 | 1  | 2  | 3  | 4  | 5  | 6]  |
|-----|----|----|----|----|----|-----|
| [ 7 | 8  | 9  | 10 | 11 | 12 | 13] |
| [14 | 15 | 16 | 17 | 18 | 19 | 20] |
| [21 | 22 | 23 | 24 | 25 | 26 | 27] |
| [28 | 29 | 30 | 31 | 32 | 33 | 34] |
| [35 | 36 | 37 | 38 | 39 | 40 | 41] |
| [42 | 43 | 44 | 45 | 46 | 47 | 48] |

Figure 10:
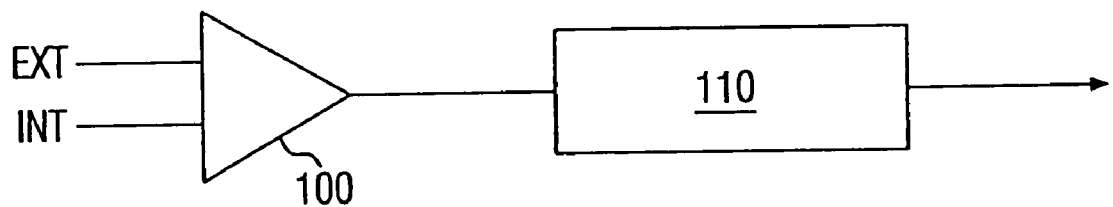
FIGS. 10 and 11 depict two types of processing elements found at the nodes of the network of FIG. 9.

At nodes 60 are two types of processing elements. As shown in FIG. 10, the processing element at each of the nodes which receive an input signal from outside the array comprises a differential amplifier 100 and an output function generator 110. Differential amplifier 100 compares the magnitude of the external signal received from outside the array with the magnitude from the signal received on the input from adjacent nodes and outputs one binary value if the first signal exceeds the second and the other binary value if the second signal exceeds the first. Function generator 110 converts the binary output from differential amplifier 100 into an analog signal, illustratively by means of an exponential function generator. Additional inputs to the function generator are a constant that can be specified by the user and an elapsed time which, illustratively, is the time since the last change in the binary value received from differential amplifier 100.

Figure 11:
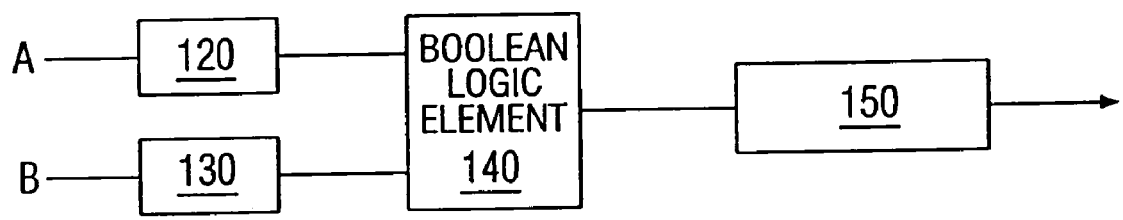

As shown in FIG. 11, the processing element at each of the remaining nodes of the array comprises first and second input signal conditioners 120, 130, a Boolean logic element 140 and an output function generator 150. First and second input signal conditioners 120, 130 are identical. Each conditioner receives the signal on one of the inputs, here identified as A and B, to the node. Preferably, each circuit is a threshold generator for comparing the signal received on an input with a threshold value and providing a binary output having a first binary value if the signal on the input exceeds the threshold and a second binary value if it does not. Boolean logic element 140 combines the two binary outputs from signal conditioners 120 and 130 in accordance with a Boolean logic function selected by the user. Function generator 150 is the same as function generator 110 of FIG. 10 and converts the binary output of Boolean logic element 140 to an analog signal.

As a result, for a network with external analog signals injected into some of the edge nodes, there will be 3 types of nodes in each network:

i—a regular internal node, although some edge nodes have only 1 input d—a regular internal node except it feeds its value to an adjacent differential amplifier D—a node which is driven by the output of a differential amplifier which has as inputs an external signal and a signal from an internal mode.

The following are tables which map the number of internal inputs, outputs, external signal inputs, and node types for a 2-dimensional exemplary network with differential amplifiers at edge nodes which otherwise would have only one input (instead of the usual 2 inputs):

TABLE 4

NUM OF INTERNAL INPUTS

| [1 | 1 | 2 | 1 | 2 | 1 | 1] |
| [2 | 2 | 2 | 2 | 2 | 2 | 2] |
| [1 | 2 | 2 | 2 | 2 | 2 | 1] |
| [2 | 2 | 2 | 2 | 2 | 2 | 2] |
| [1 | 2 | 2 | 2 | 2 | 2 | 1] |
| [2 | 2 | 2 | 2 | 2 | 2 | 2] |
| [1 | 1 | 2 | 1 | 2 | 1 | 1] |

TABLE 5

NUM OF OUTPUTS

| [1 | 2 | 1 | 2 | 1 | 2 | 1] |
| [1 | 2 | 2 | 2 | 2 | 2 | 1] |
| [2 | 2 | 2 | 2 | 2 | 2 | 2] |
| [1 | 2 | 2 | 2 | 2 | 2 | 1] |
| [2 | 2 | 2 | 2 | 2 | 2 | 2] |
| [1 | 2 | 2 | 2 | 2 | 2 | 1] |
| [1 | 2 | 1 | 2 | 1 | 2 | 1] |

TABLE 6

EXTERNAL SIGNAL INPUTS

| [0 | 1 | 0 | 1 | 0 | 1 | 0] |
| [0 | 0 | 0 | 0 | 0 | 0 | 0] |
| [1 | 0 | 0 | 0 | 0 | 0 | 1] |
| [0 | 0 | 0 | 0 | 0 | 0 | 0] |
| [1 | 0 | 0 | 0 | 0 | 0 | 1] |
| [0 | 0 | 0 | 0 | 0 | 0 | 0] |
| [0 | 1 | 0 | 1 | 0 | 1 | 0] |

TABLE 7

NODE TYPES

| [i | D | i | D | i | D | i] |
| [i | d | i | d | i | d | i] |
| [D | d | i | i | i | d | D] |
| [i | i | i | i | i | i | i] |
| [D | d | i | i | i | d | D] |
| [i | d | i | d | i | d | i] |
| [i | D | i | D | i | D | i] |

The inter-node connectivity between the nodes is specified in Table 8:

TABLE 8

| #: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| A: | 1 | 8 | 1 | 10 | 3 | 12 | 5 | 0 | 7 | 2 | 9 | 4 | 11 | 6 | 15 | 8 | 15 | 10 | 17 | 12 | 19 | 14 | 21 | 16 | 23 |
| B: |  | 3 |  | 5 |  |  |  | 14 | 9 | 16 | 11 | 18 | 13 | 20 |  | 22 | 17 | 24 | 19 | 26 |  | 28 | 23 | 30 | 25 |

| #: | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|---|---|---|
| A: | 18 | 25 | 20 | 29 | 22 | 29 | 24 | 31 | 26 | 33 | 28 | 35 | 30 | 37 | 32 | 39 | 34 | 43 | 36 | 43 | 38 | 45 | 40 | 47 |
| B: | 32 | 27 | 34 |  | 36 | 31 | 38 | 33 | 40 |  | 42 | 37 | 44 | 39 | 46 | 41 | 48 |  |  | 45 |  | 47 |  |  |

In Table 8, # specifies the node number, A identifies the node from which the first input link is received and B identifies the node from which the second input link, if any, is received.

Electronic Devices

The tendency of electronic engineers is to reduce their designs to the fewest number of electrical components. This typically minimizes space and cost. It also typically makes the design more "brittle" and vulnerable to electrical noise. For digital devices, noise is a small consideration because the "ones look so different from zeros" even if compromised by electrical noise into a 0.8 or a 0.3. For analog devices, noise is typically handled by isolating the component from sources of noise, and (human) time-consuming custom designs are employed as well.

Heretofore, there has not been a general approach to defending against electrical noise for analog devices. Among other things, this invention describes a novel approach to a general defense against noise for analog devices, as well as a general universal way to design analog (and digital) devices.

The approach described here is a general one, which applies to a wide range of analog/digital electronic devices, including but not limited to filters, oscillators, digital to analog devices, and analog to digital devices. To better illustrate the ideas contained in this patent, we will go into great depth in a particular design of an analog to digital converter.

Analog to Digital Converter Example

We describe a design of analog to digital converters (A/Ds) for two main reasons: First A/Ds are a very common and well utilized device in electronics. Second, this particular design is itself a non-trivial and novel invention. In addition to utilizing the concepts explicated above on boolean and analog networks, this A/D design also utilizes a number of other deep concepts from the science of complexity, and in some unexpected and subtle ways.

Digital to analog converters convert an analog signal ranging from, say, 0 to 1 volt and all the values in between, to some discrete digital value. If the A/D is a 6-bit unit, then the output will be a 6-bit binary number, or some value between 0 and 63 inclusive. Likewise for a 10-bit A/D the output will be some value between 0 and 1023. Even though a 1-bit A/D unit might have little practical value, it is helpful to begin describing the operation of a single bit A/D as a stepping stone to discussing more practical and complex larger units, which we will do subsequently.

One-bit A/D Converter Design

The central idea of an A/D converter design based on analog networks of the type shown in FIG. 9 is the notion of mapping a range of analog signals to single attractor. The attractor is then mapped to a particular output value. This is, of course, a reduction of information, which is precisely what an A/D converter does in its very precise way.

Hence, in this design of an A/D converter, there are two successive mappings: first the external signal is mapped to a unique attractor, and second the attractor is mapped to a discrete digital output value. In the case of a one-bit A/D converter, the discrete digital output value is a single binary value or 1 bit that is zero or one.

Figure 12:
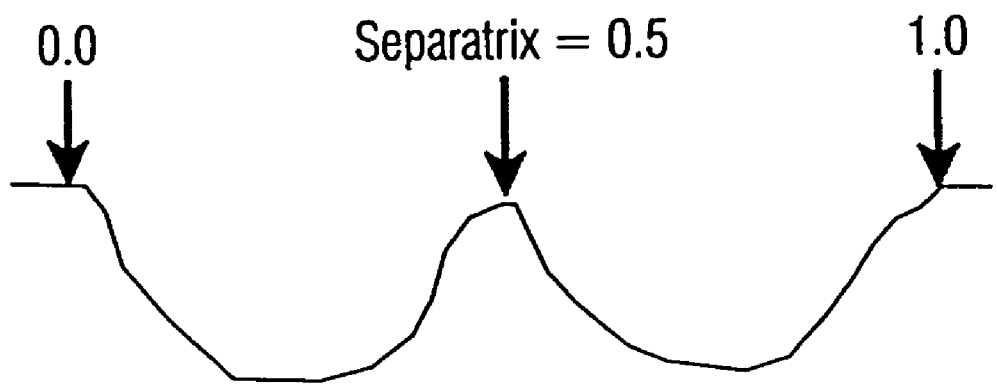
FIGS. 12 and 13 illustrate possible separatrix structures.

The ideal analog network used to implement a one-bit A/D converter would have exactly two attractors ("A0" and "A1"), or basins of attraction, and a single separatrix at 0.5, as shown in FIG. 12. Consider an external analog input signal varying from 0 to 1 inclusive. The input signal is injected into the network in the manner discussed above via differential amplifiers, or some other way. In this ideal analog network, if the input signal is in the 0.0 to 0.5 range, the network would flow toward attractor A0, and if the input signal is in the 0.5 to 1.0 range, the network would flow toward attractor A1.

Of course, very few analog networks have the structure of exactly 2 attractors with exactly one separatrix at 0.5. Most networks have the "wrong" number of attractors, and no separatrix at precisely 0.5. A 7×7 analog network is defined by 49 boolean functions (rule tables), each of which can take on 16 values, and 49 tau values, each of which can take on 15 different values if we use the scheme shown in Table 2. Accordingly, there are $16^{49} \times 15^{49} = 240^{49}$ or more than $10^{116}$ these possible different analog networks in this unimaginably huge space. It would be impossible to search the entire space of possible networks. Even if we examined one network per billionth of a second, it would take many times the lifetime of the universe to cull through all the possibilities.

Instead of exhaustively searching for the ideal analog network specification, we evolve the network we desire. We begin with an unacceptable network, and modify it or mutate it in small step-by-step ways, checking at each mutation step to see if the new network is more to our liking, or has greater fitness. The space of all possible networks has a fitness landscape. By making minuscule modifications or mutations to a given network, we are in effect, "walking" across the landscape, attempting to "climb" to ever higher terrain, to ever higher fitness.

In the case of one-bit A/D networks, there are lots of acceptable networks in the vast space of possible networks. A few thousand steps of evolutionary fitness-landscape hill-climbing will typically yield a network with exactly the desired characteristics. We have done this in computer simulations, and the results are as expected. A good one-bit A/D network can be evolved in a few minutes of PC computer time.

Note that even though this 1-bit A/D converter might seem a bit pedestrian, it nevertheless has the powerful property of being quite robust against electronic noise. As we will see below, we can make larger A/D converter units with much better noise resiliency. Nevertheless, this 1-bit A/D converter design even in its modesty, is a breakthrough in analog electronic design.

Naive Two-bit A/D /Converter Design

Figure 13:
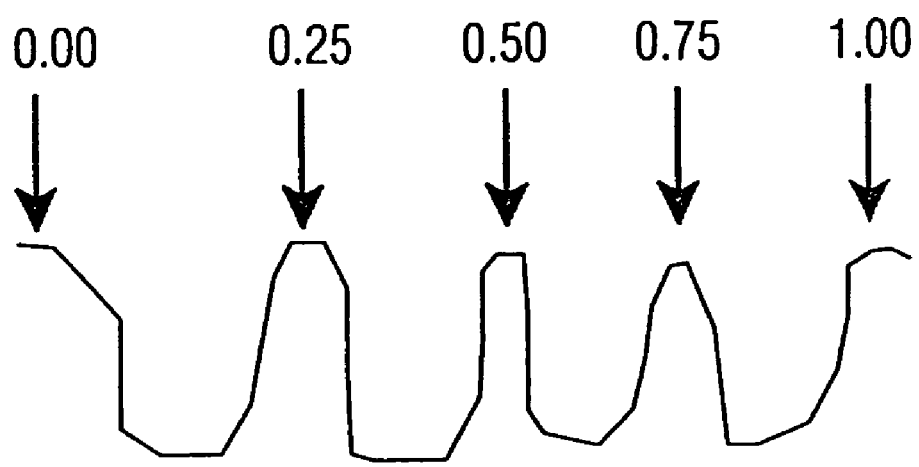

Although it is not so very difficult to construct a single bit A/D converter, as we have seen above, it is not at all obvious how to generalize this design to a multi-bit A/D converter. A naive approach to building a 2-bit A/D converter would be to hunt for an analog network which has four basins of attraction corresponding to the four possible outputs, 0, 1, 2, 3, of a 2-bit A/D converter, as shown in FIG. 13. Perhaps we could evolve a network with the structure of four equally spaced attractors.

This would be a bigger "needle in the haystack" task than the 1-bit A/D converter, but probably do-able in a reasonable amount of computer time. However, for more ambitious many-bit A/D converters, like 6-and 10-bit A/D converters, even with the best evolutionary techniques, we would be unlikely to find just the right network even if we searched for thousands of years with very fast computers. The needles are too scarce and the haystack is just too big. Instead, we need to change our approach, we need to "think out of the box" a bit.

Six-bit A/D Converter Design

For larger A/D converters, instead of trying to force our network into very stylized regular structure of attractors, instead of fighting the deep randomness of the underlying mathematics, why not harness the randomness? There is a slogan in the science of complexity, "order for free." Instead of fighting randomness, we will take advantage of it for these larger A/D converter designs.

One of the key ideas in this patent application is the notion and harnessing of redundancy. In the design of multi-bit A/D converters, we will introduce the use of multiple independent analog networks which will function in parallel. While no single network will provide a definitive discrete digital output, a suite of networks, each processing independently and "voting" in concert can give us a reliable noise-resistant digital output. In effect, we compound the suite of separate networks together, and the aggregate taken together is our finished multi-bit A/D converter.

The key big insight here is that no single network in this suite of parallel networks needs to have precisely chosen "designer" attractors and separatrix boundaries. In fact, a random spread of separatrix boundaries across each of the networks makes the entire unit more reliable and robust against noise, than cookie-cutter similar networks. Here we take advantage of diversity in much the same way living organisms have been doing it for billions of years. This is also a similar theme to the robustness of diverse food crops against disease, as opposed to the vulnerability of homogeneous single-variety food crops to catastrophic failure in the face of one deadly pathogen.

Figure 14:
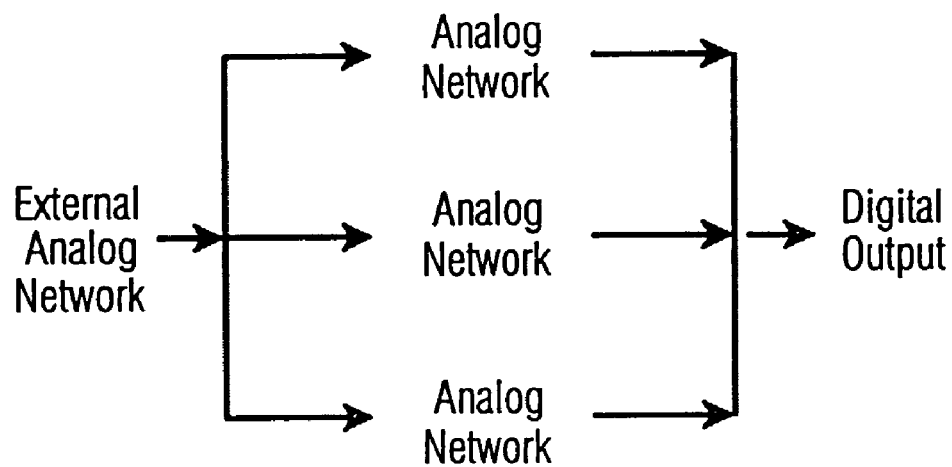
FIG. 14 is a schematic illustration of an analog-to-digital converter of the present invention.

So, for a 6-bit A/D converter we could have, say, ten separate networks of the type shown in FIG. 9 all connected in parallel as shown in FIG. 14. (The number of parallel networks is arbitrary, but the more networks, the more the unit is resistant against noise.) Each of the networks is carefully chosen for its rich number and spread of attractors—not the precise number of attractors or the precise locations of separatrix boundaries. In fact, each of the networks is evolved to have the property of having a rich number and spread of attractors for A/D uses.

Before the A/D converter is put into operation, the attractors and separatrix boundaries are mapped out so that for each attractor, the corresponding correct set of digital outputs is known and recorded for later use in production mode. In a typical network, there may be 30 attractors, each of which corresponds to 2 or 3 correct digital output values. If we had only one network (instead of an entire suite of networks), for any arbitrary input voltage we could make a pretty good guess as to the right digital output value, but we would probably not know the unique correct answer. We could, in effect, narrow down the possible outputs to a small number of candidates.

In production mode, the A/D converters function by feeding the external analog signal into each of its separate analog networks through a fan-out to the differential amplifiers at the edges of the networks, as described above. Each of the networks "runs" and finds an attractor. The specific attractor is detected using conventional techniques well known in the art. For example, as noted above, the network is a deterministic state machine. Hence, any technique for monitoring the state of a state machine may be used to monitor the state of the network. To determine if the network has found an attractor, it is necessary to determine if it has repeated a previous state. This can be determined by storing the individual states of the network in a computer memory and comparing each new state with all previous states until a match is achieved.

Figure 15:
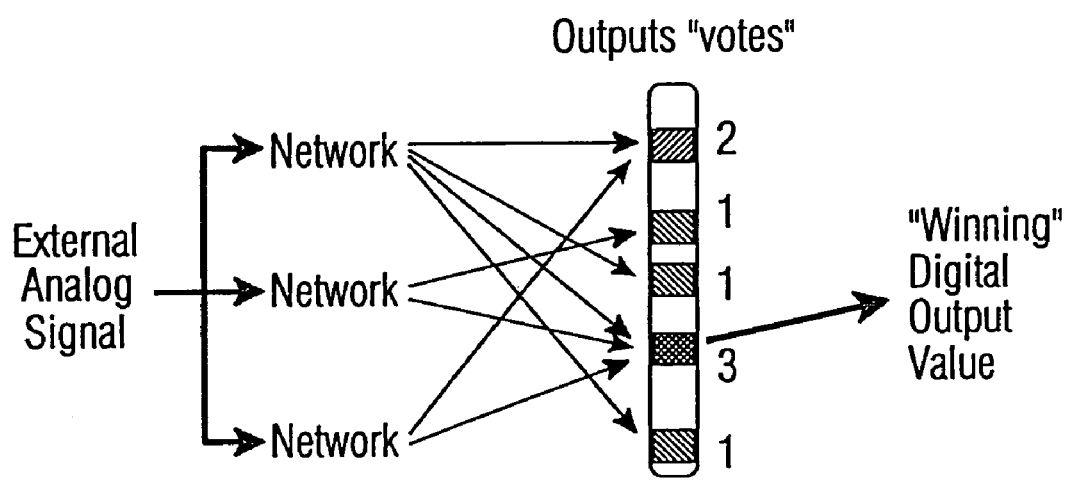
FIG. 15 is a schematic illustration depicting further details of the analog-to-digital converter of FIG. 14.

For any particular network, this attractor maps to a very few digital output candidates. No single network "knows the answer." However, each of the networks is deemed to "vote" for those digital output values that have previously been mapped to the attractor into which the network falls. As illustrated in FIG. 15, when all the networks have voted based on their best guesses based on the attractors they have fallen into, the votes are counted and a single digital output signal is chosen according to the highest number of votes. Suitable apparatus for performing such voting will be evident to those skilled in the art. Advantageously, the mapping between each attractor and the digital output candidates is stored in computer memory. As each attractor is identified, the identity of the corresponding digital outputs is retrieved from the memory and the number of times each digital output is identified is counted by appropriate arithmetic circuitry in the computer.

If each network can narrow its candidates down to only 10% of the field of possible outputs, and the attractors are spread out randomly, then the precision of the output is $0.1^{10}$ or one part in 10 billion accuracy. In practice, these attractors tend to be mostly contiguous and not distributed very randomly. Nevertheless, there is enough randomness and the ten networks taken together are quite reliable as a whole, even in the face of considerable uncorrelated electrical noise.

In the face of noise, any one network may travel through its state space and occasionally get dangerously close to a separatrix boundary, so close in fact, that with a little nudging from noise, the network may jump over the separatrix and fall into the "wrong" basin of attraction. Fortunately, since the other networks have their attractors distributed randomly with respect to this "confused" network, chances are that most of the other networks will stay well away from their dangerous separatrix boundaries, and go to the "correct" attractor in spite of noise.

Ten-bit A/D Converter Design

This approach to building A/D converters scales well to larger A/D converters. In order to further illustrate and demonstrate proof of concept, we built a computer simulation of a functional 10-bit A/D converter. This is the same design as the 6-bit A/D converter described above, except there are $2^{10}=1024$ possible digital outputs instead of 64. In order to accomplish this, we used 20 separate analog networks. Each of the networks were evolved to provide a rich widely spread set of attractors. Included below are a set of tables which can be used and are sufficient to re-create these networks and the full 10-bit A/D unit.

There are 2 tables listed below containing parameter information:
1. TT TABLE (Table 11): 20×49=980 value table of Boolean function truth tables
2. TAU TABLE (Table 12): 20×49=980 value table of tau values The TT Table contains boolean function truth tables, one per each of 49 nodes, for each of 20 analog networks. Since there are only 16 possible truth tables, for compactness and readability, the truth tables are encoded in base ten. The following conversion table will help translate the base ten number into regular boolean truth tables.

TABLE 9

| 0 | 1 | 2 | 3 | 4 | 5 | 6 | 7 |
|---|---|---|---|---|---|---|---|
| 0000 | 0001 | 0010 | 0011 | 0100 | 0101 | 0110 | 0111 |
| 8 | 9 | 10 | 11 | 12 | 13 | 14 | 15 |
| 1000 | 1001 | 1010 | 1011 | 1100 | 1101 | 1110 | 1111 |

The precise meaning of a 4-bit boolean truth table string "abcd" above is given as follows in Table 10:

TABLE 10

| 1st link A: | 0 1 0 1 |
|---|---|
| 2nd link B: | 0 0 1 1 |
| Truth table | a b c d |

So, for example, if the value on the first link A is 1 and on the second link B is 0, then the truth table output of interest is the second digit, b. In the case where TT=4, abcd=0100 and the output accordingly is 1. Another example: if A=1, B=1, and TT=14, then abcd=1110, and output=d=0.

Table 11 contains the boolean truth table themselves. This table completely specifies the boolean truth tables for all 49 nodes for all 20 analog networks. For compactness and readability, the truth tables are encoded in base 10, and can be interpreted according to Tables 9 and 10 above. The values for each of the nodes for each network are listed in vertical columns, and the networks are laid out horizontally, 0 to 19. For example the truth table for the $0^{th}$ node in the $0^{th}$ network is encoded as a 14 below. This translates to the boolean string "1110" and is explained in Table 10.

TABLE 11

TT TABLE

| Node | Net: 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 : | 14 | 4 | 0 | 0 | 14 | 3 | 11 | 13 | 3 | 8 | 2 | 4 | 1 | 2 | 7 | 8 | 2 | 4 | 10 | 12 |
| 1 : | 11 | 4 | 4 | 15 | 3 | 4 | 5 | 0 | 15 | 10 | 10 | 9 | 1 | 9 | 1 | 11 | 4 | 12 | 11 | 14 |
| 2 : | 13 | 9 | 2 | 14 | 3 | 15 | 8 | 13 | 11 | 1 | 11 | 0 | 1 | 3 | 11 | 14 | 11 | 4 | 6 | 9 |
| 3 : | 11 | 2 | 15 | 10 | 4 | 5 | 4 | 14 | 2 | 11 | 8 | 11 | 11 | 3 | 5 | 4 | 0 | 9 | 13 | 9 |
| 4 : | 5 | 6 | 4 | 10 | 5 | 9 | 5 | 6 | 0 | 13 | 12 | 13 | 2 | 4 | 9 | 11 | 14 | 11 | 15 | 10 |
| 5 : | 10 | 13 | 4 | 8 | 3 | 0 | 0 | 6 | 1 | 7 | 0 | 12 | 5 | 7 | 2 | 15 | 7 | 9 | 13 | 8 |
| 6 : | 12 | 6 | 12 | 6 | 12 | 6 | 13 | 0 | 15 | 0 | 4 | 2 | 5 | 4 | 1 | 11 | 3 | 8 | 11 | 1 |
| 7 : | 5 | 4 | 3 | 4 | 12 | 15 | 11 | 15 | 2 | 0 | 4 | 7 | 3 | 15 | 9 | 5 | 11 | 12 | 15 | 5 |
| 8 : | 6 | 15 | 9 | 12 | 8 | 3 | 7 | 10 | 12 | 7 | 2 | 12 | 7 | 12 | 15 | 10 | 14 | 2 | 10 | 4 |
| 9 : | 4 | 13 | 1 | 4 | 14 | 6 | 3 | 13 | 14 | 0 | 8 | 8 | 10 | 2 | 1 | 4 | 14 | 6 | 13 | 11 |
| 10 : | 14 | 6 | 4 | 10 | 14 | 9 | 3 | 7 | 2 | 7 | 12 | 6 | 11 | 15 | 6 | 14 | 11 | 14 | 3 | 0 |
| 11 : | 7 | 0 | 11 | 6 | 6 | 12 | 9 | 11 | 12 | 12 | 7 | 9 | 13 | 7 | 13 | 15 | 2 | 13 | 14 | 3 |
| 12 : | 15 | 2 | 0 | 9 | 13 | 9 | 8 | 12 | 5 | 9 | 14 | 11 | 14 | 2 | 11 | 7 | 13 | 11 | 15 | 14 |
| 13 : | 12 | 2 | 5 | 4 | 3 | 11 | 2 | 13 | 5 | 1 | 5 | 14 | 2 | 15 | 6 | 3 | 14 | 7 | 2 | 15 |
| 14 : | 4 | 1 | 11 | 15 | 4 | 11 | 10 | 13 | 8 | 5 | 15 | 7 | 14 | 10 | 10 | 4 | 1 | 10 | 5 | 5 |
| 15 : | 2 | 11 | 14 | 6 | 6 | 3 | 0 | 5 | 5 | 8 | 13 | 0 | 11 | 3 | 1 | 7 | 14 | 13 | 4 | 5 |
| 16 : | 7 | 4 | 0 | 12 | 15 | 5 | 11 | 8 | 6 | 11 | 8 | 5 | 8 | 6 | 15 | 8 | 11 | 1 | 2 | 6 |
| 17 : | 11 | 9 | 13 | 7 | 11 | 8 | 12 | 13 | 11 | 0 | 15 | 2 | 5 | 9 | 9 | 7 | 2 | 2 | 12 | 13 |
| 18 : | 11 | 0 | 13 | 2 | 13 | 2 | 4 | 10 | 4 | 9 | 15 | 11 | 5 | 14 | 1 | 14 | 12 | 12 | 4 | 2 |
| 19 : | 11 | 8 | 1 | 12 | 8 | 2 | 1 | 10 | 13 | 5 | 12 | 11 | 8 | 6 | 6 | 10 | 0 | 7 | 3 | 15 |
| 20 : | 11 | 7 | 1 | 7 | 12 | 2 | 0 | 2 | 14 | 3 | 11 | 15 | 7 | 2 | 6 | 3 | 12 | 14 | 3 | 2 |
| 21 : | 6 | 0 | 6 | 5 | 8 | 11 | 2 | 8 | 12 | 15 | 3 | 6 | 10 | 14 | 7 | 7 | 6 | 4 | 14 | 8 |
| 22 : | 2 | 12 | 7 | 8 | 3 | 6 | 1 | 10 | 3 | 12 | 6 | 0 | 8 | 13 | 2 | 8 | 4 | 11 | 4 | 6 |
| 23 : | 14 | 7 | 4 | 14 | 10 | 5 | 11 | 11 | 4 | 5 | 8 | 2 | 13 | 11 | 11 | 10 | 4 | 3 | 12 | 8 |
| 24 : | 12 | 7 | 7 | 5 | 12 | 2 | 12 | 13 | 7 | 7 | 11 | 10 | 14 | 4 | 11 | 13 | 13 | 7 | 7 | 2 |
| 25 : | 4 | 4 | 10 | 5 | 15 | 8 | 4 | 0 | 4 | 9 | 4 | 10 | 14 | 6 | 1 | 12 | 2 | 13 | 13 | 10 |
| 26 : | 10 | 2 | 11 | 13 | 7 | 13 | 2 | 15 | 9 | 11 | 12 | 5 | 9 | 0 | 7 | 12 | 7 | 10 | 5 | 4 |
| 27 : | 8 | 11 | 14 | 2 | 7 | 13 | 0 | 11 | 1 | 2 | 11 | 8 | 8 | 12 | 0 | 10 | 0 | 14 | 5 | 8 |
| 28 : | 3 | 10 | 6 | 4 | 2 | 3 | 3 | 15 | 6 | 15 | 0 | 15 | 7 | 0 | 10 | 15 | 8 | 9 | 14 | 7 |
| 29 : | 1 | 5 | 2 | 6 | 8 | 9 | 1 | 0 | 0 | 1 | 15 | 2 | 8 | 5 | 2 | 6 | 7 | 14 | 5 | 5 |
| 30 : | 3 | 0 | 11 | 10 | 9 | 0 | 0 | 6 | 1 | 5 | 0 | 11 | 8 | 10 | 15 | 15 | 1 | 2 | 12 | 8 |
| 31 : | 1 | 4 | 5 | 11 | 13 | 14 | 10 | 6 | 9 | 11 | 12 | 12 | 11 | 14 | 1 | 8 | 13 | 0 | 0 | 14 |
| 32 : | 10 | 11 | 7 | 8 | 0 | 6 | 5 | 5 | 15 | 8 | 1 | 6 | 4 | 1 | 10 | 2 | 9 | 6 | 11 | 14 |
| 33 : | 5 | 3 | 15 | 8 | 0 | 1 | 2 | 11 | 7 | 9 | 8 | 13 | 9 | 3 | 12 | 11 | 4 | 8 | 13 | 2 |
| 34 : | 9 | 4 | 13 | 9 | 3 | 1 | 7 | 7 | 0 | 9 | 3 | 13 | 15 | 8 | 3 | 14 | 14 | 0 | 12 | 1 |
| 35 : | 6 | 13 | 13 | 12 | 3 | 13 | 1 | 1 | 7 | 13 | 10 | 4 | 10 | 4 | 15 | 10 | 10 | 5 | 7 | 0 |
| 36 : | 3 | 0 | 11 | 10 | 12 | 11 | 2 | 12 | 0 | 7 | 3 | 7 | 4 | 12 | 6 | 6 | 12 | 11 | 8 | 3 |
| 37 : | 15 | 15 | 13 | 9 | 7 | 6 | 8 | 2 | 2 | 14 | 6 | 1 | 11 | 9 | 9 | 0 | 0 | 3 | 5 | 14 |
| 38 : | 14 | 12 | 4 | 9 | 3 | 0 | 12 | 14 | 1 | 12 | 6 | 4 | 3 | 9 | 7 | 5 | 1 | 11 | 2 | 9 |
| 39 : | 4 | 4 | 10 | 3 | 8 | 0 | 7 | 10 | 3 | 3 | 6 | 3 | 10 | 13 | 7 | 6 | 14 | 10 | 4 | 0 |
| 40 : | 2 | 11 | 2 | 4 | 3 | 7 | 10 | 9 | 0 | 12 | 2 | 13 | 2 | 9 | 8 | 15 | 4 | 5 | 3 | 10 |
| 41 : | 2 | 2 | 6 | 0 | 5 | 11 | 6 | 15 | 4 | 3 | 11 | 15 | 2 | 3 | 5 | 3 | 14 | 9 | 9 | 2 |
| 42 : | 9 | 10 | 4 | 2 | 2 | 6 | 6 | 6 | 5 | 4 | 12 | 2 | 12 | 2 | 5 | 6 | 5 | 4 | 8 | 13 |
| 43 : | 6 | 8 | 9 | 5 | 11 | 4 | 2 | 14 | 6 | 2 | 5 | 14 | 12 | 4 | 11 | 3 | 8 | 6 | 15 | 14 |
| 44 : | 0 | 6 | 12 | 8 | 3 | 7 | 1 | 15 | 15 | 7 | 4 | 2 | 2 | 11 | 7 | 9 | 11 | 11 | 12 | 14 |
| 45 : | 4 | 14 | 15 | 2 | 13 | 9 | 3 | 1 | 9 | 6 | 3 | 0 | 8 | 12 | 5 | 6 | 14 | 14 | 4 | 4 |
| 46 : | 11 | 3 | 3 | 4 | 0 | 14 | 8 | 13 | 6 | 3 | 15 | 2 | 13 | 15 | 13 | 4 | 1 | 13 | 1 | 7 |
| 47 : | 10 | 5 | 11 | 7 | 7 | 13 | 9 | 7 | 2 | 10 | 1 | 5 | 13 | 7 | 15 | 7 | 5 | 1 | 4 | 10 |
| 48 : | 12 | 7 | 3 | 12 | 11 | 10 | 0 | 10 | 10 | 3 | 13 | 15 | 6 | 1 | 5 | 13 | 11 | 0 | 3 | 0 |

In order to fully specify a set of analog networks, as described in this patent application, for each node we must specify a boolean function, and a tau value. Although there are an infinite number of possible tau values, for simplicity, we have limited the number of tau values to 15. These values are described in Table 2 above. The following Table 12 of tau values is organized similarly to the Table 11, with one base-ten number per node, 49 nodes per network laid out in vertical columns, and the 20 networks laid out horizontally.

design of an analog to digital converter above in order to provide detailed insight into this area of the invention, as well as to give a clear and powerful example of a particular use of these novel ideas. However, the ideas described in this document are far more general than just A/D converters. The notions of using rich sets of attractors, harnessing redundancy for robustness against electronic noise, and evolving these devices, are quite general and have wide application in electronic design and construction of electronic devices.

TABLE 12

TAU TABLE

| Node | Net: 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0: | 9 | 1 | 14 | 9 | 10 | 15 | 13 | 12 | 3 | 8 | 14 | 7 | 4 | 15 | 5 | 12 | 12 | 8 | 10 | 6 |
| 1: | 2 | 12 | 8 | 10 | 3 | 8 | 14 | 2 | 14 | 12 | 8 | 9 | 10 | 7 | 12 | 12 | 6 | 11 | 4 | 6 |
| 2: | 7 | 4 | 3 | 15 | 7 | 14 | 1 | 4 | 11 | 4 | 14 | 11 | 3 | 12 | 2 | 7 | 5 | 15 | 3 | 7 |
| 3: | 6 | 14 | 3 | 5 | 7 | 5 | 11 | 11 | 10 | 15 | 5 | 11 | 4 | 6 | 14 | 8 | 2 | 9 | 13 | 9 |
| 4: | 5 | 9 | 8 | 7 | 4 | 12 | 10 | 5 | 1 | 13 | 10 | 2 | 13 | 11 | 3 | 3 | 13 | 7 | 7 | 4 |
| 5: | 6 | 6 | 5 | 6 | 11 | 1 | 13 | 12 | 1 | 2 | 14 | 9 | 9 | 6 | 6 | 11 | 10 | 2 | 1 | 4 |
| 6: | 9 | 14 | 2 | 5 | 15 | 6 | 15 | 15 | 5 | 7 | 8 | 7 | 8 | 6 | 3 | 11 | 13 | 12 | 12 | 2 |
| 7: | 9 | 4 | 9 | 14 | 10 | 14 | 7 | 9 | 14 | 10 | 2 | 9 | 1 | 1 | 3 | 13 | 12 | 6 | 12 | 2 |
| 8: | 11 | 2 | 9 | 5 | 6 | 5 | 9 | 6 | 12 | 13 | 1 | 1 | 10 | 10 | 14 | 8 | 6 | 7 | 9 | 5 |
| 9: | 11 | 8 | 6 | 11 | 12 | 7 | 2 | 11 | 15 | 14 | 9 | 9 | 10 | 12 | 8 | 6 | 9 | 10 | 1 | 7 |
| 10: | 13 | 5 | 9 | 11 | 5 | 2 | 15 | 6 | 3 | 3 | 6 | 4 | 13 | 1 | 9 | 6 | 7 | 2 | 11 | 4 |
| 11: | 5 | 6 | 10 | 6 | 6 | 7 | 7 | 1 | 10 | 10 | 10 | 9 | 4 | 1 | 7 | 9 | 3 | 9 | 5 | 14 |
| 12: | 11 | 9 | 9 | 12 | 11 | 10 | 7 | 15 | 15 | 13 | 1 | 11 | 5 | 1 | 12 | 2 | 2 | 3 | 7 | 8 |
| 13: | 5 | 5 | 7 | 8 | 11 | 15 | 3 | 15 | 5 | 6 | 2 | 7 | 13 | 8 | 4 | 11 | 7 | 13 | 9 | 14 |
| 14: | 4 | 14 | 13 | 8 | 12 | 4 | 6 | 9 | 13 | 1 | 1 | 4 | 6 | 15 | 8 | 7 | 7 | 13 | 4 | 8 |
| 15: | 9 | 9 | 11 | 3 | 9 | 6 | 12 | 6 | 2 | 15 | 1 | 5 | 9 | 11 | 15 | 3 | 10 | 10 | 5 | 6 |
| 16: | 8 | 13 | 8 | 5 | 9 | 5 | 8 | 2 | 11 | 4 | 11 | 9 | 12 | 13 | 12 | 2 | 5 | 3 | 3 | 1 |
| 17: | 3 | 5 | 8 | 7 | 13 | 1 | 8 | 6 | 10 | 12 | 13 | 7 | 11 | 9 | 15 | 13 | 12 | 14 | 12 | 7 |
| 18: | 15 | 12 | 12 | 8 | 7 | 11 | 3 | 8 | 8 | 6 | 8 | 12 | 10 | 10 | 2 | 15 | 9 | 7 | 13 | 14 |
| 19: | 5 | 4 | 9 | 14 | 10 | 10 | 13 | 15 | 13 | 14 | 9 | 8 | 11 | 9 | 7 | 3 | 14 | 3 | 3 | 5 |
| 20: | 14 | 14 | 12 | 9 | 15 | 3 | 9 | 8 | 13 | 5 | 9 | 3 | 4 | 3 | 15 | 6 | 4 | 5 | 15 | 7 |
| 21: | 10 | 4 | 10 | 1 | 13 | 5 | 14 | 13 | 2 | 15 | 15 | 15 | 4 | 12 | 4 | 5 | 3 | 9 | 9 | 14 |
| 22: | 6 | 2 | 12 | 9 | 9 | 6 | 9 | 12 | 8 | 11 | 4 | 8 | 2 | 5 | 15 | 13 | 3 | 6 | 14 | 15 |
| 23: | 14 | 5 | 5 | 15 | 2 | 2 | 2 | 9 | 5 | 14 | 5 | 6 | 6 | 7 | 2 | 11 | 10 | 15 | 7 | 10 |
| 24: | 6 | 2 | 8 | 9 | 4 | 12 | 10 | 8 | 11 | 9 | 7 | 13 | 3 | 12 | 4 | 11 | 3 | 12 | 7 | 14 |
| 25: | 3 | 7 | 14 | 5 | 2 | 5 | 14 | 6 | 8 | 14 | 11 | 9 | 14 | 3 | 11 | 14 | 10 | 9 | 10 | 5 |
| 26: | 10 | 11 | 3 | 2 | 9 | 2 | 6 | 9 | 1 | 8 | 1 | 5 | 12 | 13 | 10 | 12 | 14 | 2 | 4 | 7 |
| 27: | 2 | 9 | 10 | 4 | 3 | 4 | 13 | 6 | 9 | 11 | 9 | 1 | 11 | 1 | 13 | 11 | 14 | 3 | 8 | 6 |
| 28: | 6 | 12 | 8 | 8 | 9 | 11 | 15 | 12 | 11 | 7 | 3 | 13 | 14 | 11 | 13 | 2 | 10 | 11 | 8 | 4 |
| 29: | 6 | 2 | 6 | 14 | 14 | 4 | 12 | 12 | 10 | 5 | 3 | 6 | 8 | 7 | 2 | 8 | 1 | 11 | 1 | 11 |
| 30: | 4 | 12 | 5 | 14 | 5 | 7 | 7 | 10 | 12 | 2 | 2 | 2 | 14 | 13 | 10 | 5 | 7 | 13 | 7 | 4 |
| 31: | 14 | 11 | 4 | 7 | 12 | 6 | 15 | 13 | 7 | 14 | 14 | 10 | 12 | 2 | 14 | 9 | 2 | 8 | 3 | 2 |
| 32: | 9 | 11 | 6 | 8 | 3 | 6 | 6 | 6 | 1 | 4 | 10 | 7 | 15 | 13 | 10 | 3 | 14 | 9 | 6 | 13 |
| 33: | 2 | 6 | 8 | 10 | 11 | 5 | 3 | 6 | 1 | 2 | 2 | 13 | 9 | 7 | 8 | 11 | 12 | 5 | 5 | 6 |
| 34: | 8 | 15 | 1 | 10 | 14 | 5 | 5 | 10 | 13 | 14 | 3 | 13 | 12 | 14 | 11 | 11 | 2 | 8 | 10 | 3 |
| 35: | 12 | 9 | 11 | 13 | 6 | 4 | 3 | 1 | 7 | 7 | 1 | 8 | 13 | 3 | 3 | 10 | 9 | 3 | 5 | 12 |
| 36: | 7 | 1 | 5 | 3 | 10 | 12 | 11 | 1 | 7 | 10 | 9 | 4 | 1 | 6 | 7 | 10 | 13 | 2 | 12 | 9 |
| 37: | 2 | 8 | 15 | 10 | 3 | 9 | 8 | 6 | 12 | 9 | 4 | 15 | 14 | 7 | 15 | 9 | 2 | 11 | 13 | 15 |
| 38: | 14 | 13 | 2 | 3 | 10 | 2 | 2 | 10 | 6 | 12 | 3 | 5 | 12 | 14 | 1 | 3 | 15 | 4 | 7 | 7 |
| 39: | 5 | 3 | 8 | 5 | 11 | 14 | 4 | 12 | 12 | 6 | 11 | 11 | 14 | 9 | 10 | 7 | 5 | 15 | 12 | 8 |
| 40: | 2 | 5 | 4 | 8 | 5 | 3 | 11 | 3 | 9 | 13 | 13 | 10 | 13 | 4 | 5 | 12 | 15 | 14 | 2 | 4 |
| 41: | 5 | 3 | 1 | 10 | 5 | 15 | 14 | 15 | 10 | 2 | 3 | 11 | 5 | 15 | 7 | 1 | 15 | 11 | 9 | 14 |
| 42: | 7 | 3 | 3 | 6 | 3 | 6 | 15 | 15 | 13 | 10 | 15 | 15 | 13 | 7 | 6 | 12 | 14 | 8 | 13 | 3 |
| 43: | 3 | 8 | 12 | 10 | 6 | 9 | 3 | 4 | 12 | 13 | 5 | 11 | 5 | 10 | 3 | 4 | 2 | 9 | 15 | 14 |
| 44: | 4 | 7 | 11 | 12 | 2 | 13 | 11 | 6 | 8 | 5 | 5 | 3 | 13 | 14 | 6 | 12 | 2 | 3 | 11 | 8 |
| 45: | 2 | 12 | 14 | 7 | 15 | 9 | 4 | 4 | 3 | 15 | 13 | 5 | 12 | 8 | 4 | 15 | 13 | 12 | 13 | 6 |
| 46: | 15 | 6 | 13 | 8 | 1 | 15 | 14 | 2 | 5 | 14 | 14 | 7 | 7 | 9 | 15 | 12 | 2 | 11 | 13 | 5 |
| 47: | 1 | 6 | 6 | 5 | 8 | 11 | 11 | 14 | 1 | 10 | 3 | 12 | 8 | 12 | 6 | 14 | 2 | 6 | 14 | 8 |
| 48: | 9 | 3 | 14 | 2 | 9 | 11 | 3 | 10 | 2 | 2 | 8 | 15 | 14 | 8 | 4 | 14 | 13 | 15 | 2 | 1 |

Advantageously, all twenty networks as described in Tables 11 and 12 are implemented in a single integrated circuit.

Other Analog Devices: Filters, Oscillators

The ideas described in the patent application apply to a wide range of electronic devices. We described a particular These same deep principles inherent in this A/D aspect of the invention, can also be applied to the design and construction of filters, digital-to-analog devices, oscillators, and many other wide-ranging devices. Many devices like filters and oscillators rely on the characteristics of electronic waveforms. Circuits which manage wave form information are used in almost all devices including televisions, communications devices, home electronics, computers, etc. These circuits have traditionally been built to minimize part count, are vulnerable to noise, and typically must be isolated from digital components which generate noise. With this invention alternative designs are possible.

The networks described herein have natural oscillatory characteristics. Just as these networks can be targeted at building A/D converters, likewise, these networks can also be utilized to build devices which are based on oscillating waveforms. Any arbitrary network may not have the correct characteristics to address the need, but if an appropriate fitness function can be defined for the required device, then beginning with an arbitrary network and using the ideas in this patent, we can evolve the network to have the desired functionality.

Filter Evolution Example

Self-navigating software agents can be used to create signal filters. In this design, each self-navigating agent evolves in such a manner that the various agents cooperate to form a signal having characteristics which match an input signal. As is known to those familiar with the art of signal processing, an input waveform sampled at its Nyquist frequency can be decomposed into a set of frequency-based components such that the original waveform can be reconstituted from its complex Fourier coefficients. This concept forms the underpinnings for using self-navigating agents to evolve into a functions which collectively reconstitute an input waveform.

A collection, or array, of a number P of autonomous agents is created. Each agent $h_i$ is formed as a simple sinusoid characterized by a triplet of its amplitude $A_i$, phase $\phi_i$ and frequency $f_i$: $h_i = A_i \sin(f_i n + \phi_i)$, $i=1, 2, \ldots, P$. Thus, a 3-D frequency-phase-amplitude (FPA) space is created The 3-D space itself is quantized into discrete points in each of the three dimensions. For example, phase from $0-2\pi$ may be divided into 100 discrete units, i.e., 1% increments, or into 128 discrete units, i.e., units spaced apart by $2\pi/128$ radian, or some other number of units. Similarly, the frequency can be quantized into a number of units based on a percentage or other portion of the sampling frequency, and the amplitude may be quantized into a number of units as well. Any particular point in this 3-D space corresponds to a particular sinusoid described by its unique FPA coordinates. A set of P such points corresponds to a set of P sinusoids, and the sum of these P sinusoids forms some waveform.

Each of the P agents navigates on a "fitness landscape" by being perturbed within the 3-D space, subject to established constraints. At each step, or clock tick, each agent's FPA triplet (i.e., each dimension in FPA space) is perturbed in a random direction (increased or decreased) by some number of quantized values. The number of units by which each parameter is perturbed may be set to a first predetermined number, e.g., 1, or may itself be random within a predefined range, and may even allow for no change at all, i.e., be 0 on some clock ticks. For example, if this first predetermined number is set to 1 for each of the three parameters for all the agents, then all the agents undergo a random walk in 3-D space as they evolve. Thus, the three parameters of each of the agents are changed in accordance with one or more predetermined rules.

Before any navigation is performed, however, the three parameters for each of the P agents must be initialized, and this can be done in a number of ways. For example, all three parameters can be initialized to specific values, initialized randomly over the FPA space, or be specified according to some predetermined criteria. Regardless of how initialization is performed, in this embodiment, each agent generates a corresponding simple sinusoid according to its position in FPA space.

During evolution, each of the P agents navigates through FPA space to nearby positions in an attempt to improve the fitness of the aggregate set of agents. A "fitness" or evaluation function, $E_m$ for the $m^{th}$ clock tick, is defined as the difference between the input waveform and the synthetic signal represented by the sum of the waveforms represented by the P agents. This fitness function can be used as a metric to determine the goodness of the fit, with a small $E_m$ being indicative of better fitness. Termination of the evolution, i.e., "stop condition" occurs upon reaching some predetermined criterion such as a particular fitness value, a finite number of clock ticks, or some other stop condition, although there is no termination, if one is tracking a changing signal. In the case of a dynamically changing signal, the aggregate of agents will track that signal, albeit with some latency.

During evolution, each agent evaluates the "benefit" of moving to an adjacent position in the FPA space based on a calculated improvement in overall system fitness. If an agent determines that such a movement is beneficial, it will make such a move. However, due to the oscillating character of sinusoids, what looks like a good move at one point in time may turn out to be a bad move in a few clock ticks. Because of this, a predetermined number N of the most recently traversed points in FPA space for each of the agents is stored in a memory, so as to enable the system to backtrack to previous position. The exact number N of how many points are stored can depend on factors such as the wavelength corresponding to that agent's $f_i$, the wavelength of a dominant frequency peak in the spectrum of the input waveform, or some other predetermined value based on parameters associated with the various agents, the input waveform, or any other criteria, including a fixed number of points. Maintaining such a memory allows the agents to make their moves with more confidence to thereby realize a best fit.

In practice, all P agents operate simultaneously in parallel so that they may move at cross-purposes, a first agent moving in FPA space toward a second agent, even while that second agent moves away from its own position. Thus, each agent implicitly deforms the landscapes of its sister agents in a search for settling on an attractor in which the overall array of agents converge on a god imitation of the external input signal. Effectively, then, the agents collectively try to find a best fit on a ever-changing landscape.

Narrow-band filter

Figure 16A:
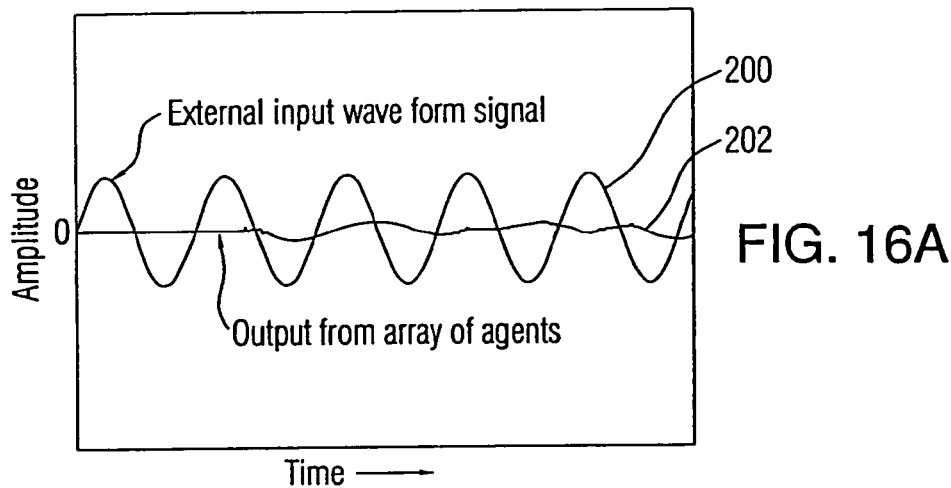
FIGS. 16a–c illustrate the effect of evolving a narrowband filter to match a narrowband input signal.
Figure 16B:
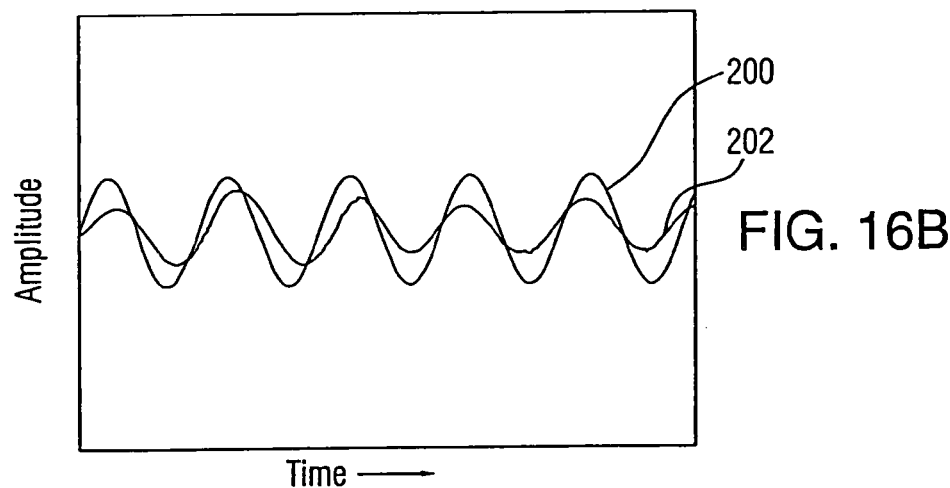
Figure 16C:
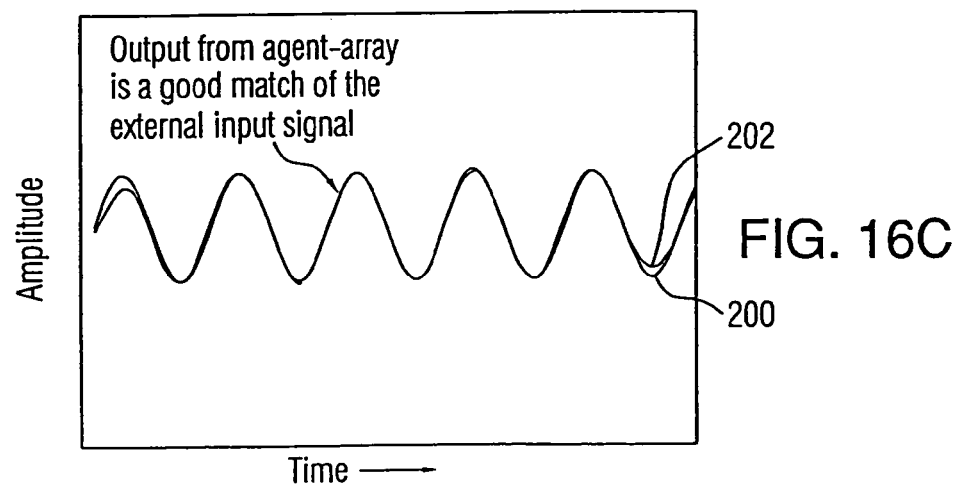

In a first simulation written in the Java programming language, a total of P=30 agents were created. The agents were initialized by setting all the amplitudes to zero, and allowing the frequency and phase to take on random values within their respective ranges, for each agent. During evolution, each agent was allowed to perform a random walk in the discretized FPA space, one unit in each of the three dimensions. An external input signal comprising a single sinusoid was used in an attempt to determine whether the various agents could evolve in FPA space so as to collectively mimic the input waveform. FIG. 16a shows the external input waveform 200 which is a single sinusoid and remains constant as a function of time. Superimposed on FIG. 16a is the synthetic signal output 202 from the array of agents. Initially, the output signal is 0, because the amplitudes were all set to zero and there is no match between the output signal and the input signal. However, with the passage of time, as the agents evolve, the output signal 202 slowly begins to depart from a value of zero, as the agents begin to improve their positions in FPA space. As seen in FIG. 16b, the output signal 202 begins to first track the input signal 200 and then increasingly take on its character. As this happens, each triplet corresponding to an agent performs a random walk in FPA space. As time goes on the collection of agents evolves into a better fit. Finally, as seen in FIG. 16c, after a few more clock ticks, the output signal 202 becomes almost a perfect match of the input signal 200, as the array of agents finds collectively find optimal values in FPA space. Thus, in this example, the system of agents collectively evolved into a matched filter.

Low-pass filter

Figure 17A:
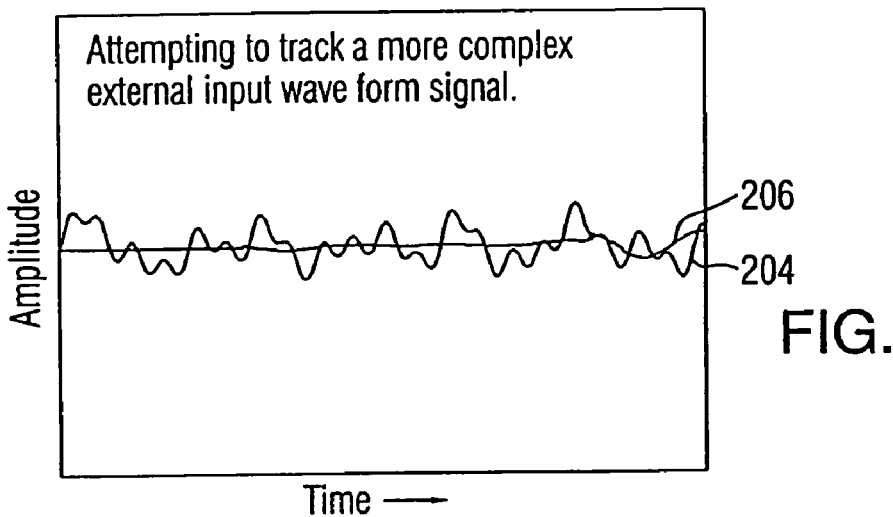
FIGS. 17a–c illustrate the effect of evolving a low pass filter to match the lower frequencies of a broadband input signal.
Figure 17B:
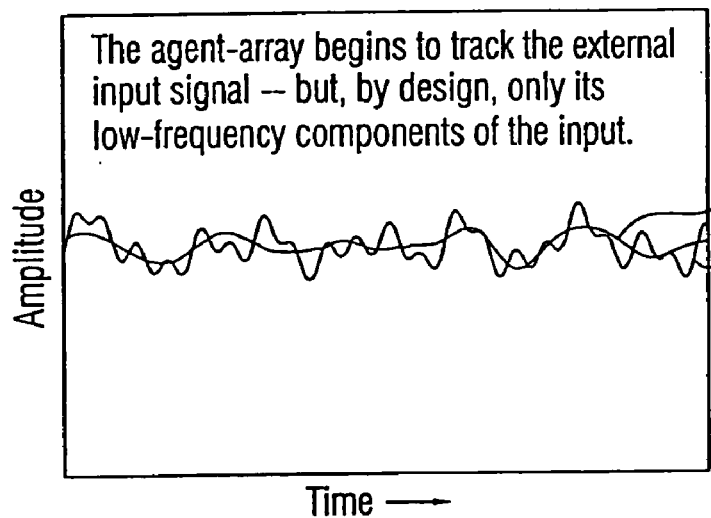

In a second simulation, again a total of P=30 agents were created, initialized as in the previous example. Again, during evolution, each agent was allowed to perform a random walk in the discretized FPA space, one unit in each of the three dimensions. As seen in FIG. 17a, a complex waveform comprising a sum of five sinusoids having different amplitudes, frequencies and phases was used as the input signal 204. This time, the system was allowed to evolve, but the frequency range of the agents was confined or restricted to only lower frequencies. This was done to prevent the agents from reaching the higher frequencies to determine whether the array of agents could function as a low-pass filter, i.e., pass only the low frequencies of the input signal. As seen in FIG. 17b, the output signal 206 begins to match the input signal 204, but only for the low frequencies, which is consistent with the constraints placed on the agents. Finally, as seen in FIG. 17c, the agents collective form a low-pass filter in which the low frequency variation of the input signal is followed, while the high frequency components are ignored.

Figure 17C:
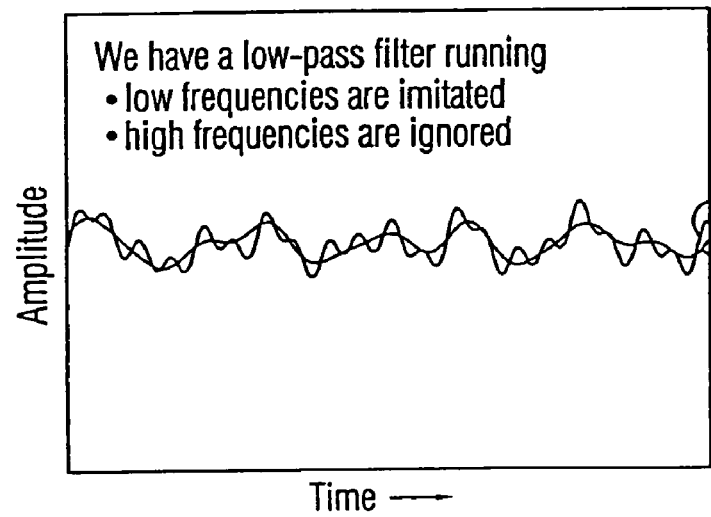
Figure 18A:
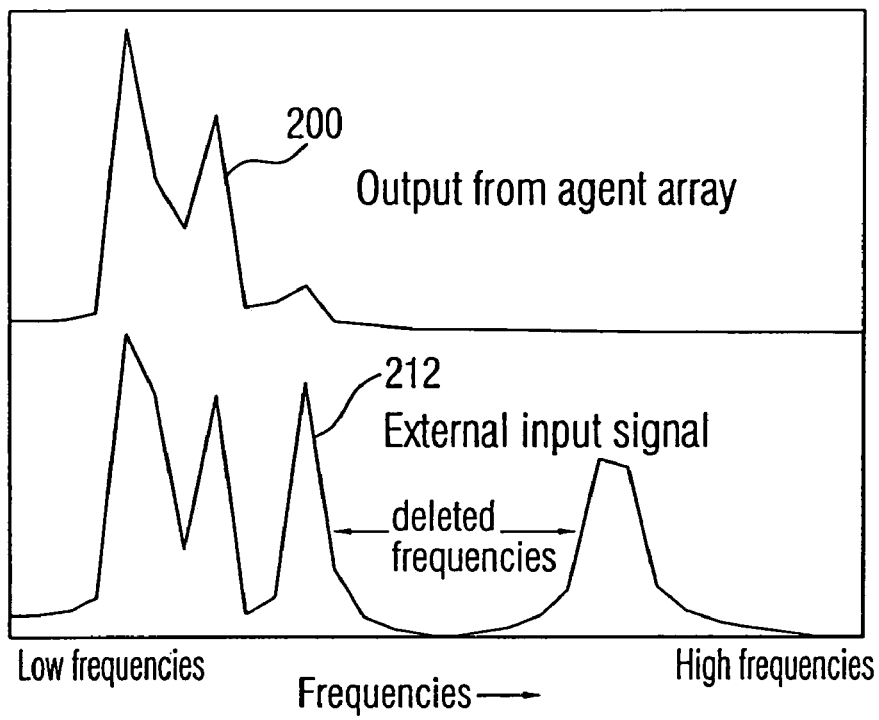
FIG. 18a compares the frequencies of the evolved filter with those of the input signal of FIGS. 17a–c.

FIG. 18a compares the output signal's Fourier spectrum 210 with the external input signal's Fourier spectrum, for the signals of FIGS. 17a–17c. As seen in FIG. 18a, the agents were able to produce an output signal whose spectrum substantially matches the low frequencies of the external input signal. Furthermore, the high frequencies in the external input signal are eliminated.

Figure 18B:
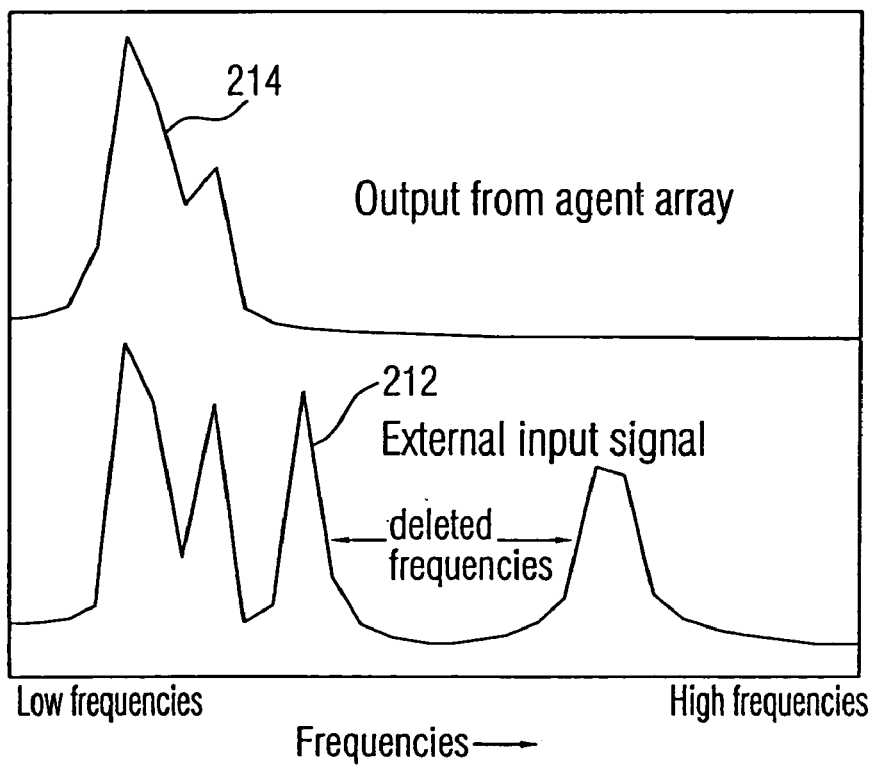
FIG. 18b compares the frequencies of another evolved filter from a different run, with those of the input signal of FIGS. 17a–c.

FIG. 18b compares a second output signal's Fourier spectrum 214 with the Fourier spectrum 216 of the same external input signal seen in FIGS. 17a–c. The second output signal is the result of a different "run" exercised on the same external input signal as before. Given the stochastic or random walk character of this approach, and the self-navigating agents, each run can produce slightly different results. Nevertheless, each run evolves into a filter which is close to an ideal matched filter for the lower frequencies, in accordance with the frequency constraints placed on the agents. More importantly, this approach to filter design harnesses "randomness", thereby making it a more robust approach against electronic noise.

While the above described filter was developed using agents which are permitted to take on sinusoidal forms, it should be kept in mind that each agent may instead be permitted to take on some other function with a different set of parameters. For example, the agents may take on wavelet forms parameterized by a different set of coefficients. Additionally, other orthogonal, and even non-orthogonal sets of functions may be used to impart signal properties to the various agents, as they evolve. Finally, the agents themselves may represent two-dimensional surfaces, for use in image decomposition, image matching, and 2-D filtering operations.

There are many potential applications which can benefit from the filter paradigm discussed above. Effectively, the described system permits agents to collectively mimic signals, regardless of their origin, subject to any constraints placed on the agents. Thus, one example in which such a system may be used is in learning to discriminate between different types of signals. For instance, sampled signals representing sound, vibration or some other physical measurement from an engine of other machinery may be used by such agents to characterize that equipment, perhaps even to distinguish "good" equipment from "bad" equipment. As a natural extension of this, controllers incorporating such evolved systems may be used to adaptively control such equipment.

Automatic On-Chip Evolution

The present invention describes how electronic devices can be evolved, as opposed to designed analytically. This is how living organisms have been "designing themselves" for billions of years. Clearly it works, and it works astonishingly well. Heretofore electronic devices have been designed analytically by engineers, meaning the final design was the result of a step-by-step process of human thinking or cognitive processing. Drawing from biology, is it apparent that one can evolve a design of a particular A/D unit, or filter. Likewise, many other electronic devices can also be evolved dynamically.

For the A/D unit and the filters, the networks were evolved "off line" with a computer modeling program. However, one could instead build chips where the evolutionary process takes place onboard the chip itself. This represents a breakthrough in chip design, on a par with field programmable gate arrays (FPGAs). FPGAs allow for the fabrication of general-purpose chips. Automatically Evolving Chips (AECs) would also be general-purpose chips, perhaps more general than FPGAs because they can be targeted at both analog and digital functionality.

What is claimed is:

1. A two-dimensional array of processing elements wherein:

each processing element in the interior of the array comprises:

two inputs from processing elements on either side along a first dimension of the array;
two outputs to processing elements on either side along a second dimension of the array; and
Boolean logic circuitry for generating an output signal that is a Boolean function of two input signals;
and at least some of the processing elements in the interior of the array comprise:
circuitry for changing the magnitude of the output signal from the Boolean logic circuitry and for applying it to both outputs; and
threshold circuitry for comparing signals on the two inputs with a threshold value and providing binary input signals to the Boolean logic circuitry having a first value if the signal on an input exceeds the threshold and a second value if the signal on the input does not exceed the threshold value; and
some processing elements on the edge of the array comprise:
a first input from a processing element in the interior of the array;
a second input from outside of the array;
two outputs to processing elements on either side along the edge of the array;
a differential amplifier for comparing signals on the first and second inputs and providing a binary output signal having a first value if the signal on the second input exceeds the signal on the first input and a second value if the signal on the second input does not exceed the signal on the first input; and
circuitry for changing the magnitude of the binary output signal and for applying it to both outputs.

2. An analog-to-digital converter comprising:
an analog signal input
a two-dimensional array of interconnected processing elements having a plurality of attractors each known to be associated with at least one digital value wherein:
each processing element in the interior of the array comprises:
two inputs from processing elements on either side along a first dimension of the array;
two outputs to processing elements on either side along a second dimension of the array; and
Boolean logic circuitry for generating an output signal that is a Boolean function of two input signals;
and at least some of the processing elements in the interior of the array comprise:
circuitry for changing the magnitude of the output signal from the Boolean logic circuitry and for applying it to both outputs; and
threshold circuitry for comparing signals on the two inputs with a threshold value and providing binary input signals to the Boolean logic circuitry having a first value if the signal on an input exceeds the threshold and a second value if the signal on the input does not exceed the threshold value; and
some processing elements on the edge of the array comprise:
a first input from a processing element in the interior of the array;
a second input connected to the analog signal input;
two outputs to processing elements on either side along the edge of the array;
a differential amplifier for comparing signals on the first and second inputs and providing a binary output signal having a first value if the signal on the second input exceeds the signal on the first input and a second value if the signal on the second input does not exceed the signal on the first input; and
circuitry for changing the magnitude of the binary output signal and for applying it to both outputs;
means for detecting into which attractor the array of interconnected processing elements has fallen.

3. An analog-to-digital converter comprising:
an analog signal input;
a plurality of two-dimensional arrays of interconnected processing elements each having at least one attractor known to be associated with at least one digital value wherein:
each processing element in the interior of the array comprises:
two inputs from processing elements on either side along a first dimension of the array;
two outputs to processing elements on either side along a second dimension of the array; and
Boolean logic circuitry for generating an output signal that is a Boolean function of two input signals;
and at least some of the processing elements in the interior of the array comprise:
circuitry for changing the magnitude of the output signal from the Boolean logic circuitry and for applying it to both outputs; and
threshold circuitry for comparing signals on the two inputs with a threshold value and providing binary input signals to the Boolean logic circuitry having a first value if the signal on an input exceeds the threshold and a second value if the signal on the input does not exceed the threshold value; and
some processing elements on the edge of the array comprise:
a first input from a processing element in the interior of the array;
a second input connected to the analog signal input;
two outputs to processing elements on either side along the edge of the array;
a differential amplifier for comparing signals on the first and second inputs and providing a binary output signal having a first value if the signal on the second input exceeds the signal on the first input and a second value if the signal on the second input does not exceed the signal on the first input; and
circuitry for changing the magnitude of the binary output signal and for applying it to both outputs;
means for detecting into which attractor each array of interconnected processing elements has fallen, and for generating an output signal identifying the digital value(s) known to be associated with that attractor; and
a voting circuit for identifying the digital value identified the most number of times in the output signals from the plurality of arrays.

4. A signal processor comprising:
a signal input;
a two-dimensional array of interconnected processing elements having a plurality of attractors each known to be associated with an output value wherein;
each processing element in the interior of the array comprises:
two inputs from processing elements on either side along a first dimension of the array;
two outputs to processing elements on either side along a second dimension of the array; and
Boolean logic circuitry for generating an output signal that is a Boolean function of two input signals;

and at least some of the processing elements in the interior of the array comprise:

circuitry for changing the magnitude of the output signal from the Boolean logic circuitry and for applying it to both outputs; and threshold circuitry for comparing signals on the two inputs with a threshold value and providing binary input signals to the Boolean logic circuitry having a first value if the signal on an input exceeds the threshold and a second value if the signal on the input does not exceed the threshold value; and some processing elements on the edge of the array comprise:

a first input from a processing element in the interior of the array;

a second input connected to the signal input;

two outputs to processing elements on either side along the edge of the array;

a differential amplifier for comparing signals on the first and second inputs and providing a binary output signal having a first value if the signal on the second input exceeds the signal on the first input and a second value if the signal on the second input does not exceed the signal on the first input; and circuitry for changing the magnitude of the binary output signal and for applying it to both outputs; and means for detecting into which attractor each array of interconnected processing elements has fallen.

5. A signal processor comprising:

a signal input;

a plurality of two-dimensional arrays of interconnected processing elements each having at least one attractor known to be associated with an output value wherein;

each processing element in the interior of the array comprises:

two inputs from processing elements on either side along a first dimension of the array;

two outputs to processing elements on either side along a second dimension of the array; and Boolean logic circuitry for generating an output signal that is a Boolean function of two input signals;

and at least some of the processing elements in the interior of the array comprise:

circuitry for changing the magnitude of the output signal from the Boolean logic circuitry and for applying it to both outputs; and threshold circuitry for comparing signals on the two inputs with a threshold value and providing binary input signals to the Boolean logic circuitry having a first value if the signal on an input exceeds the threshold and a second value if the signal on the input does not exceed the threshold value; and some processing elements on the edge of the array comprise:

a first input from a processing element in the interior of the array;

a second input connected to the signal input;

two outputs to processing elements on either side along the edge of the array;

a differential amplifier for comparing signals on the first and second inputs and providing a binary output signal having a first value if the signal on the second input exceeds the signal on the first input and a second value if the signal on the second input does not exceed the signal on the first input; and circuitry for changing the magnitude of the binary output signal and for applying it to both outputs; and means for detecting into which attractor each array of interconnected processing elements has fallen; and for generating an output signal identifying the output value; and a voting circuit for identifying the output value identified the most number of times in the output signals from the plurality of arrays.

6. A method of operating a two-dimensional array of interconnected processing elements having a plurality of attractors each known to be associated with at least one digital value wherein:

each processing element in the interior of the array comprises:

two inputs from processing elements on either side along a first dimension of the array;

two outputs to processing elements on either side along a second dimension of the array; and Boolean logic circuitry for generating an output signal that is a Boolean function of two input signals;

and at least some of the processing elements in the interior of the array comprise:

circuitry for changing the magnitude of the output signal from the Boolean logic circuitry and for applying it to both outputs; and threshold circuitry for comparing signals on the two inputs with a threshold value and providing binary input signals to the Boolean logic circuitry having a first value if the signal on an input exceeds the threshold and a second value if the signal on the input does not exceed the threshold value; and some processing elements on the edge of the array comprise:

a first input from a processing element in the interior of the array;

a second input from outside of the array;

two outputs to processing elements on either side along the edge of the array;

a differential amplifier for comparing signals on the first and second inputs and providing a binary output signal having a first value if the signal on the second input exceeds the signal on the first input and a second value if the signal on the second input does not exceed the signal on the first input; and circuitry for changing the magnitude of the binary output signal and for applying it to both outputs, said method comprising the steps of:

applying an input signal to at least one second input; and detecting into which attractor the array has fallen.

7. The method of claim 6 comprising the step of applying the input signal in parallel to a plurality of second inputs.

8. The method of claim 6 comprising the steps of:

applying the input signal in parallel to second inputs in a plurality of arrays of interconnected processing elements having a plurality of attractors each known to be associated with at least one digital value; and identifying the output value associated the most number of times with the attractors into which the arrays have fallen.

9. The method of claim 6 wherein the input signal is an analog signal and the output signal is a digital signal.

10. A method of operating a plurality of two-dimensional arrays of interconnected processing elements each having at least one attractor known to be associated with at least one output value wherein:

each processing element in the interior of the array comprises:

two inputs from processing elements on either side along a first dimension of the array;

two outputs to processing elements on either side along a second dimension of the array; and Boolean logic circuitry for generating an output signal that is a Boolean function of two input signals;

and at least some of the processing elements in the interior of the array comprise:

circuitry for changing the magnitude of the output signal from the Boolean logic circuitry and for applying it to both outputs; and threshold circuitry for comparing signals on the two inputs with a threshold value and providing binary input signals to the Boolean logic circuitry having a first value if the signal on an input exceeds the threshold and a second value if the signal on the input does not exceed the threshold value; and some processing elements on the edge of the array comprise:

a first input from a processing element in the interior of the array;

a second input from outside of the array;

two outputs to processing elements on either side along the edge of the array;

a differential amplifier for comparing signals on the first and second inputs and providing a binary output signal having a first value if the signal on the second input exceeds the signal on the first input and a second value if the signal on the second input does not exceed the signal on the first input; and circuitry for changing the magnitude of the binary output signal and for applying it to both outputs, said method comprising the steps of:

applying an input signal in parallel to at least one second input in each array; and detecting into which attractor each array has fallen.

11. The method of claim 10 comprising the step of applying the input signal in parallel to a plurality of second inputs in each array.

12. The method of claim 10 comprising the step of:

identifying the output value associated the most number of times with the attractors into which the arrays have fallen.

* * * * *